US009446690B2

(12) United States Patent
Shigematsu et al.

(10) Patent No.: US 9,446,690 B2
(45) Date of Patent: Sep. 20, 2016

(54) POWER SEAT OPERATION DEVICE AND POWER SEAT

(71) Applicant: NHK SPRING CO., LTD., Yokohama-shi (JP)

(72) Inventors: Ryohei Shigematsu, Yokohama (JP); Shinji Iino, Yokohama (JP); Souichi Nakayama, Yokohama (JP); Masato Shirao, Yokohama (JP); Takeshi Nakamura, Yokohama (JP); Masahiro Oda, Yokohama (JP); Kenichi Katsube, Yokohama (JP)

(73) Assignee: NHK SPRING CO., LTD., Yokohama-shi (JP)

( * ) Notice: Subject to any disclaimer, the term of this patent is extended or adjusted under 35 U.S.C. 154(b) by 0 days.

(21) Appl. No.: 14/423,573

(22) PCT Filed: Aug. 21, 2013

(86) PCT No.: PCT/JP2013/072327
§ 371 (c)(1),
(2) Date: Feb. 24, 2015

(87) PCT Pub. No.: WO2014/034501
PCT Pub. Date: Mar. 6, 2014

(65) Prior Publication Data
US 2015/0321587 A1 Nov. 12, 2015

(30) Foreign Application Priority Data
Aug. 31, 2012 (JP) .................................. 2012-192489

(51) Int. Cl.
*B60N 2/02* (2006.01)
*B60N 2/44* (2006.01)
(Continued)

(52) U.S. Cl.
CPC ............. *B60N 2/442* (2013.01); *B60N 2/0228* (2013.01); *B60N 2/0296* (2013.01); *B60N 2/06* (2013.01);
(Continued)

(58) Field of Classification Search
CPC ...... B60N 2/0228; B60N 2/442; B60N 2/06; B60N 2/16; B60N 2/22; B60N 2/0296; B60N 2/4495; B60N 2/62; B60N 2/66; B60N 2002/4425; H01H 9/00; H01H 25/00
See application file for complete search history.

(56) References Cited

U.S. PATENT DOCUMENTS

| | | | |
|---|---|---|---|
| 6,515,241 B2 * | 2/2003 | Saiki .................... | B60N 2/0228 200/17 R |
| 8,232,486 B2 * | 7/2012 | Ujimoto ............... | B60N 2/0228 200/339 |

(Continued)

FOREIGN PATENT DOCUMENTS

| | | |
|---|---|---|
| CN | 1853985 A | 11/2006 |
| JP | 2009-298282 A | 12/2009 |

(Continued)

OTHER PUBLICATIONS

Office Action issued May 3, 2016 in corresponding CN Application No. 201380045521.2.

*Primary Examiner* — Philip Gabler
(74) *Attorney, Agent, or Firm* — Knobbe Martens Olson & Bear LLP

(57) ABSTRACT

A power seat operation device is configured in such a manner that, when a dial member is rotated and operated, a movable mechanism which is to be operated is selected from among movable mechanisms. When a switch member is rotated and operated, the selected movable mechanism is actuated. The switch member is rotated and operated about a rotation axis extending in the widthwise direction of the seat. Thus the direction of operation of the switch member can be aligned with or nearly aligned with both the direction of the actual movement of a seat back when a recliner mechanism is actuated and the direction of the actual movement of an ottoman when an ottoman mechanism is actuated. Also, in a state in which a seat slide mechanism is selected, the direction of the operation of the switch member is aligned with the front-rear direction of the seat.

6 Claims, 26 Drawing Sheets

(51) Int. Cl.
*B60N 2/06* (2006.01)
*B60N 2/16* (2006.01)
*B60N 2/22* (2006.01)
*B60N 2/62* (2006.01)
*B60N 2/66* (2006.01)
*H01H 25/00* (2006.01)
*H01H 25/06* (2006.01)
*H01H 25/04* (2006.01)

(52) U.S. Cl.
CPC . *B60N 2/16* (2013.01); *B60N 2/22* (2013.01); *B60N 2/449* (2013.01); *B60N 2/4495* (2013.01); *B60N 2/62* (2013.01); *B60N 2/66* (2013.01); *H01H 25/00* (2013.01); *H01H 25/065* (2013.01); *B60N 2002/4425* (2013.01); *H01H 2025/048* (2013.01)

(56) References Cited

U.S. PATENT DOCUMENTS

| | | | |
|---|---|---|---|
| 2001/0048239 A1* | 12/2001 | Kogure | B60N 2/62 297/423.2 |
| 2009/0294259 A1* | 12/2009 | Kuno | B60N 2/0228 200/4 |
| 2012/0175227 A1* | 7/2012 | Komatsu | B60N 2/0228 200/4 |

FOREIGN PATENT DOCUMENTS

| | | |
|---|---|---|
| JP | 2011-011606 A | 1/2011 |
| JP | 4680170 B2 | 5/2011 |
| JP | 2012-096709 A | 5/2012 |

\* cited by examiner

POWER SEAT OPERATION DEVICE AND POWER SEAT

CROSS-REFERENCE TO RELATED APPLICATIONS

This application is the U.S. National Phase under 35 U.S.C. §371 of International Application PCT/JP2013/072327, filed Aug. 21, 2013, which claims priority to Japanese Patent Application No. 2012-192489, filed Aug. 31, 2012. The disclosures of the above-described applications are hereby incorporated by reference in their entirety and are hereby expressly made a portion of this application. The International Application was published under PCT Article 21(2) in a language other than English.

TECHNICAL FIELD

The present invention relates to an operation device for operating plural moving mechanisms disposed in a power seat, and a power seat.

RELATED ART

In the operation device described in patent document 1 listed below, a dial disposed on a side portion of a seat cushion can be operated by turning it, and a switch attached to the dial can be operated by sliding it relative to the dial. Additionally, the turning operation of the dial is a selection operation that selects a moving mechanism that becomes a target of operation from among plural moving mechanisms disposed in a vehicle seat, and the sliding operation of the switch is an activation operation that activates the selected moving mechanism. Because of this, the plural moving mechanisms can be operated by one operation device.

Furthermore, in the electrically powered operation device for a vehicle seat described in patent document 2 listed below, an operation portion disposed on a side portion of a seat cushion can be operated by turning it and can be operated by sliding it in a radial direction. Additionally, the turning operation of the operation portion is a selection operation that selects a moving mechanism that becomes a target of operation from among plural moving mechanisms disposed in a vehicle seat, and the sliding operation of the operation portion is an activation operation that activates the selected moving mechanism. Because of this, the plural moving mechanisms can be operated by one operation portion.

CITATION LIST

Patent Documents

Patent Document 1: JP-A No. 2011-11606
Patent Document 2: Japanese Patent No. 4,680,170

SUMMARY OF INVENTION

Technical Problem

In this connection, the moving mechanisms disposed in a power seat include moving mechanisms that move moving parts by turning them, such as a recliner mechanism that causes a seat back to move by turning it relative to a seat cushion and an ottoman mechanism that causes an ottoman to move by turning it relative to the seat cushion. In a case where this kind of moving mechanism is operated by an operation device such as described above, there are cases where it is difficult to intuitively operate the moving mechanism because the directions in which the switch or the operation portion is operated by being slid and the actual directions in which the moving part is moved are different.

In consideration of the circumstances described above, it is an object of the present invention to obtain a power seat operation device and a power seat with which plural moving mechanisms can be selectively operated and which make it possible, without compromising the intuitive operational feeling with respect to a moving mechanism that causes a moving part to linearly move, to intuitively operate a moving mechanism that causes a moving part to move by turning it.

Solution to Problem

A power seat operation device of a first aspect of the present invention comprises: a selection operation member that is disposed in such a way as to be turnable relative to a power seat, with the turning operation of the selection operation member relative to the power seat being a selection operation that selects a moving mechanism that becomes a target of operation from among plural moving mechanisms disposed in the power seat; and an activation operation member that is disposed in such a way as to be turnable about a turning axis of the selection operation member or about a turning axis along that turning axis relative to the selection operation member, with the turning operation of the activation operation member relative to the selection operation member being an activation operation that activates the moving mechanism selected by the selection operation.

"Turn" in the first aspect is synonymous with "rotate". The same also holds true in the second aspect to the seventh aspect described below.

In the power seat operation device of the first aspect, when the selection operation member is operated by being turned relative to the power seat, a moving mechanism that becomes a target of operation is selected from among the plural moving mechanisms disposed in the power seat. Additionally, when the activation operation member is operated by being turned relative to the selection operation member, the selected moving mechanism is activated. Because of this, the plural moving mechanisms can be selectively operated. Moreover, because the activation operation member is operated by being turned relative to the selection operation member, even in a case where the plural moving mechanisms include a moving mechanism that causes a moving part of the power seat to move by turning it, the operational directions of the activation operation member can be made to coincide with or resemble the actual directions in which the moving part is moved by ensuring that the turning axis of the activation operation member is along the turning axis of the moving part. Because of this, intuitive operation becomes possible. Furthermore, in a case where the plural moving mechanisms include a moving mechanism that causes a moving part of the power seat to linearly move, it suffices to ensure that the operational directions of the activation operation member are along the linear moving direction of the moving part in a state in which the selection operation member has been operated to a turning position in which that moving mechanism is selected as the target of operation. Because of that, it can be ensured that the intuitive operational feeling with respect to the moving mechanism that causes the moving part to linearly move is not compromised.

A power seat operation device of a second aspect of the present invention is the first aspect, wherein the plural moving mechanisms include a moving mechanism that causes a moving part with which the power seat is equipped to turn about a turning axis along the seat width direction, and the selection operation member is disposed on the power seat in such a way that the turning axis of the activation operation member is along the seat width direction.

In the second aspect, the selection operation member is disposed on the power seat in such a way that the turning axis of the activation operation member is along the seat width direction. Because of this, the actual moving directions of the moving part that is turned about the turning axis along the seat width direction and the operational directions of the activation operation member coincide with or resemble one another, so intuitive operation becomes possible.

A power seat operation device of a third aspect of the present invention is the first aspect or the second aspect, wherein the selection operation member has an outer peripheral portion along a virtual circle centered on the turning axis of the selection operation member and a recessed portion that is open at least at the outer peripheral portion, and an operation portion of the activation operation member is disposed in the recessed portion.

In the third aspect, the selection operation member has the outer peripheral portion along a virtual circle centered on the turning axis of the selection operation member, so it becomes possible for a seated person to visually recognize that the selection operation member is something that is operated by being turned. Furthermore, the operation portion of the activation operation member is disposed in the recessed portion that is open at least at the outer peripheral portion of the selection operation member, so erroneous activations caused by the operation portion of the activation operation member being inadvertently operated can be prevented or deterred.

A power seat operation device of a fourth aspect of the present invention is the power seat operation device according to the first aspect or the second aspect, wherein the selection operation member has a lever portion that extends along a direction orthogonal to the turning axis of the selection operation member, and the activation operation member is disposed on a distal end side of the lever portion.

In the fourth aspect, the seated person can grip the lever portion and operate the selection operation member by turning it, so the operability of the selection operation member can be made well. Furthermore, the activation operation member is disposed on the distal end side of the lever portion, so the seated person can, for example, use the thumb or the index finger of the hand gripping the lever portion to operate the activation operation member by turning it. Because of this, the operability of the activation operation member can be made well.

A power seat operation device of a fifth aspect of the present invention is the first aspect or the second aspect, wherein the activation operation member is disposed on one turning axis direction side of the selection operation member relative to the selection operation member and is turnable about the turning axis of the selection operation member relative to the selection operation member.

In the fifth aspect, when the seated person operates the selection operation member by turning it, it suffices, for example, for the seated person to grip both the selection operation member and the activation operation member disposed on the one turning axis direction side of the selection operation member and operate both by turning them. Next, when the seated person operates the activation operation member by turning it, it suffices for the seated person to shift the hand gripping both the selection operation member and the activation operation member and grip just the activation operation member. The turning axis of the activation operation member coincides with the turning axis of the selection operation member, so the activation operation member can be operated by turning it using the same hand motions as those used in the turning operation of the selection operation member. Because of this, the operability of the selection operation member and the activation operation member can be made well.

A power seat of a sixth aspect of the present invention comprises: plural moving mechanisms that include a seat sliding mechanism that causes a seat cushion to slide in the seat front and rear direction relative to a vehicle body floor portion and a recliner mechanism that causes a seat back to turn about a turning axis along the seat width direction relative to the seat cushion and also include one of a lifter mechanism that causes the seat cushion to move up and down relative to the vehicle body floor portion and an ottoman mechanism that causes an ottoman to turn about a turning axis along the seat width direction relative to the seat cushion; and the power seat operation device of any one of the first to fifth aspects, with the selection operation member being disposed on a side portion of the seat cushion in a state in which the turning axis of the selection operation member is aligned with the seat width direction, wherein in a state in which the selection operation member is positioned in a position in which the operational directions of an operation portion of the activation operation member are along the seat front and rear direction, the seat sliding mechanism is selected as the target of operation, in a state in which the selection operation member is positioned in a position in which the operational directions of the operation portion are along a direction slanted relative to the seat front and rear direction, the recliner mechanism is selected as the target of operation, and in a state in which the selection operation member is positioned in a position in which the operational directions of the operation portion are along the seat up and down direction, the one is selected as the target of operation.

The sixth aspect includes a power seat having a configuration where the turning axis of the ottoman changes position relative to the seat cushion in accompaniment with the turning of the ottoman (e.g., a type of power seat where the ottoman is coupled to the seat cushion via a four-bar linkage). The same also holds true in the seventh aspect.

In the sixth aspect, the selection operation member of the power seat operation device is disposed on the side portion of the seat cushion of a seat body. The selection operation member is turnable about a turning axis along the seat width direction. The activation operation member is disposed on the selection operation member. The activation operation member is turnable about the turning axis of the selection operation member or about a turning axis along that turning axis—that is, about a turning axis along the seat width direction—relative to the selection operation member.

Here, when the seated person wants to activate the seat sliding mechanism, first the seated person operates the selection operation member by turning it to the position in which the operational directions of the operation portion of the activation operation member are along the seat front and rear direction. Because of this, the seat sliding mechanism is selected as the target of operation. In this state, when the activation operation member is operated by being turned, the seat sliding mechanism is activated. Moreover, in this state, the operational directions of the operation portion of the activation operation member are along the actual directions (the seat front and rear direction) in which the seat cushion is moved by the activation of the seat sliding mechanism, so it can be ensured that the intuitive operational feeling with respect to the seat sliding mechanism is not compromised.

Furthermore, when the seated person wants to activate the recliner mechanism, first the seated person operates the selection operation member by turning it to the position in which the operational directions of the operation portion of the activation operation member are along a direction slanted relative to the seat front and rear direction. Because of this, the recliner mechanism is selected as the target of operation. In this state, when the activation operation member is operated by being turned, the recliner mechanism is activated. The operational directions of the operation portion of the activation operation member coincide with or resemble the actual directions (one direction about the turning axis along the seat width direction or the other direction about the turning axis) in which the seat back is moved by the activation of the recliner mechanism, so intuitive operation becomes possible.

Moreover, when the seated person wants to activate the lifter mechanism or the ottoman mechanism, first the seated person operates the selection operation member by turning it to the position in which the operational directions of the operation portion of the activation operation member are along the seat up and down direction. Because of this, the lifter mechanism or the ottoman mechanism is selected as the target of operation. In this state, when the activation operation member is operated by being turned, the lifter mechanism or the ottoman mechanism is activated. Moreover, in this state, the operational directions of the operation portion of the activation operation member are along the actual directions (the seat up and down direction) in which the seat cushion is moved by the activation of the lifter mechanism and coincide with or resemble the actual directions (one direction about the turning axis along the seat width direction or the other direction about the turning axis) in which the ottoman is moved by the activation of the ottoman mechanism. Because of this, it can be ensured that the intuitive operational feeling with respect to the lifter mechanism is not compromised, and intuitive operation with respect to the ottoman mechanism becomes possible.

A power seat of a seventh aspect comprises: plural moving mechanisms that include a seat sliding mechanism that causes a seat cushion to slide in the seat front and rear direction relative to a vehicle body floor portion, a recliner mechanism that causes a seat back to turn about a turning axis along the seat width direction relative to the seat cushion, a lifter mechanism that causes the seat cushion to move up and down relative to the vehicle body floor portion, and an ottoman mechanism that causes an ottoman to turn about a turning axis along the seat width direction relative to the seat cushion; and the power seat of any one of the first to fifth aspects, with the selection operation member being disposed on a side portion of the seat cushion in a state in which the turning axis of the selection operation member is aligned with the seat width direction, wherein in a state in which the selection operation member is positioned in a position in which the operational directions of an operation portion of the activation operation member are along the seat front and rear direction, the seat sliding mechanism is selected as the target of operation, in a state in which the selection operation member is positioned in a position in which the operational directions of the operation portion are along the seat up and down direction, the lifter mechanism is selected as the target of operation, in a state in which the selection operation member is positioned in a position in which the operational directions of the operation portion are along a direction slanted up in front relative to the seat front and rear direction, one of the recliner mechanism and the ottoman mechanism is selected as the target of operation, and in a state in which the selection operation member is positioned in a position in which the operational directions of the operation portion are along a direction slanted down in front relative to the seat front and rear direction, the other of the recliner mechanism and the ottoman mechanism is selected as the target of operation.

In the seventh aspect, the selection operation member of the power seat operation device is disposed on the side portion of the seat cushion of a seat body. The selection operation member is turnable about a turning axis along the seat width direction. The activation operation member is disposed on the selection operation member. The activation operation member is turnable about the turning axis of the selection operation member or about a turning axis along that turning axis—that is, about a turning axis along the seat width direction—relative to the selection operation member.

Here, when the seated person wants to activate the seat sliding mechanism, first the seated person operates the selection operation member by turning it to the position in which the operational directions of the operation portion of the activation operation member are along the seat front and rear direction. Because of this, the seat sliding mechanism is selected as the target of operation. In this state, when the activation operation member is operated by being turned, the seat sliding mechanism is activated. Moreover, in this state, the operational directions of the operation portion of the activation operation member are along the actual directions (the seat front and rear direction) in which the seat cushion is moved by the activation of the seat sliding mechanism, so it can be ensured that the intuitive operational feeling with respect to the seat sliding mechanism is not compromised.

Furthermore, when the seated person wants to activate the lifter mechanism, first the seated person operates the selection operation member by turning it to the position in which the operational directions of the operation portion of the activation operation member are along the seat up and down direction. Because of this, the lifter mechanism is selected as the target of operation. In this state, when the activation operation member is operated by being turned, the lifter mechanism is activated. Moreover, in this state, the operational directions of the operation portion of the activation operation member are along the actual directions (the seat up and down direction) in which the seat cushion is moved by the activation of the lifter mechanism, so it can be ensured that the intuitive operational feeling with respect to the lifter mechanism is not compromised.

Moreover, when the seated person wants to activate one of the recliner mechanism and the ottoman mechanism, first the seated person operates the selection operation member by turning it to the position in which the operational directions of the operation portion of the activation operation member are along a direction slanted up in front relative to the seat front and rear direction. Because of this, the one is selected as the target of operation. In this state, when the activation operation member is operated by being turned, the one is activated. The operational directions of the operation portion of the activation operation member coincide with or resemble the actual directions (one direction about the turning axis along the seat width direction or the other direction about the turning axis) in which the seat back is moved by the activation of the recliner mechanism and the actual directions (one direction about the turning axis along the seat width direction or the other direction about the turning axis) in which the ottoman is moved by the activation of the ottoman mechanism, so intuitive operation with respect to the one becomes possible.

Furthermore, when the seated person wants to activate the other of the recliner mechanism and the ottoman mechanism, first the seated person operates the selection operation member by turning it to the position in which the operational directions of the operation portion of the activation operation member are along a direction slanted down in front relative to the seat front and rear direction. Because of this, the other is selected as the target of operation. In this state, when the activation operation member is operated by being turned, the other is activated. The operational directions of the operation portion of the activation operation member coincide with or resemble the actual directions in which the seat back is moved by the activation of the recliner mechanism and the actual directions in which the ottoman is moved by the activation of the ottoman mechanism, so intuitive operation with respect to the other becomes possible.

A power seat of an eighth aspect comprises: plural moving mechanisms that include a seat sliding mechanism that causes a seat cushion to slide in the seat front and rear direction relative to a vehicle body floor portion, a recliner mechanism that causes a seat back to turn about a turning axis along the seat width direction relative to the seat cushion, a lifter mechanism that causes the seat cushion to move up and down relative to the vehicle body floor portion, and a tilt mechanism that causes a front portion of the seat cushion to move up and down relative to the vehicle body floor portion; and the power seat operation device of any one of the first to fifth aspects, with the selection operation member being disposed on a side portion of the seat cushion in a state in which the turning axis of the selection operation member is aligned with the seat width direction, wherein in a state in which the selection operation member is positioned in a first position in which the operational directions of an operation portion of the activation operation member are along the seat front and rear direction, the seat sliding mechanism is selected as the target of operation, in a state in which the selection operation member is positioned in a second position in which the operational directions of the operation portion are along the seat up and down direction, the lifter mechanism is selected as the target of operation, in a state in which the selection operation member is positioned in a third position in which the operational directions of the operation portion are along a direction slanted down in front relative to the seat front and rear direction, one of the recliner mechanism and the tilt mechanism is selected as the target of operation, and in a state in which the selection operation member is positioned in a fourth position in which the operational directions of the operation portion are along a direction slanted further down in front than the third position relative to the seat front and rear direction, the other of the recliner mechanism and the tilt mechanism is selected as the target of operation.

In the eighth aspect, the selection operation member of the power seat operation device is disposed on the side portion of the seat cushion of a seat body. The selection operation member is turnable about a turning axis along the seat width direction. The activation operation member is disposed on the selection operation member. The activation operation member is turnable about the turning axis of the selection operation member or about a turning axis along that turning axis—that is, about a turning axis along the seat width direction—relative to the selection operation member.

Here, when the seated person wants to activate the seat sliding mechanism, first the seated person operates the selection operation member by turning it to the first position in which the operational directions of the operation portion of the activation operation member are along the seat front and rear direction. Because of this, the seat sliding mechanism is selected as the target of operation. In this state, when the activation operation member is operated by being turned, the seat sliding mechanism is activated. Moreover, in this state, the operational directions of the operation portion of the activation operation member are along the actual directions (the seat front and rear direction) in which the seat cushion is moved by the activation of the seat sliding mechanism, so it can be ensured that the intuitive operational feeling with respect to the seat sliding mechanism is not compromised.

Furthermore, when the seated person wants to activate the lifter mechanism, first the seated person operates the selection operation member by turning it to the second position in which the operational directions of the operation portion of the activation operation member are along the seat up and down direction. Because of this, the lifter mechanism is selected as the target of operation. In this state, when the activation operation member is operated by being turned, the lifter mechanism is activated. Moreover, in this state, the operational directions of the operation portion of the activation operation member are along the actual directions (the seat up and down direction) in which the seat cushion is moved by the activation of the lifter mechanism, so it can be ensured that the intuitive operational feeling with respect to the lifter mechanism is not compromised.

Moreover, when the seated person wants to activate one of the recliner mechanism and the tilt mechanism, first the seated person operates the selection operation member by turning it to the third position in which the operational directions of the operation portion of the activation operation member are along a direction slanted up in front relative to the seat front and rear direction. Because of this, the one is selected as the target of operation. In this state, when the activation operation member is operated by being turned, the one is activated. The operational directions of the operation portion of the activation operation member coincide with or resemble the actual directions (one direction about the turning axis along the seat width direction or the other direction about the turning axis) in which the seat back is moved by the activation of the recliner mechanism and the actual directions (one direction about the turning axis along the seat width direction or the other direction about the turning axis) in which the front portion of the seat cushion is moved by the activation of the tilt mechanism, so intuitive operation with respect to the one becomes possible.

Furthermore, when the seated person wants to activate the other of the recliner mechanism and the tilt mechanism, first the seated person operates the selection operation member by turning it to the fourth position in which the operational directions of the operation portion of the activation operation member are along a direction slanted further down in front than the third position relative to the seat front and rear direction. Because of this, the other is selected as the target of operation. In this state, when the activation operation member is operated by being turned, the other is activated. The operational directions of the operation portion of the activation operation member coincide with or resemble the actual directions in which the seat back is moved by the activation of the recliner mechanism and the actual directions in which the front portion of the seat cushion is moved by the activation of the tilt mechanism, so intuitive operation with respect to the other becomes possible.

Advantageous Effects of Invention

As described above, with the power seat operation device and the power seat pertaining to the present invention, plural moving mechanisms can be selectively operated and it becomes possible, without compromising the intuitive operational feeling with respect to a moving mechanism that causes a moving part to linearly move, to intuitively operate a moving mechanism that causes a moving part to move by turning it.

DESCRIPTION OF EMBODIMENTS

First Embodiment

Figure 1:
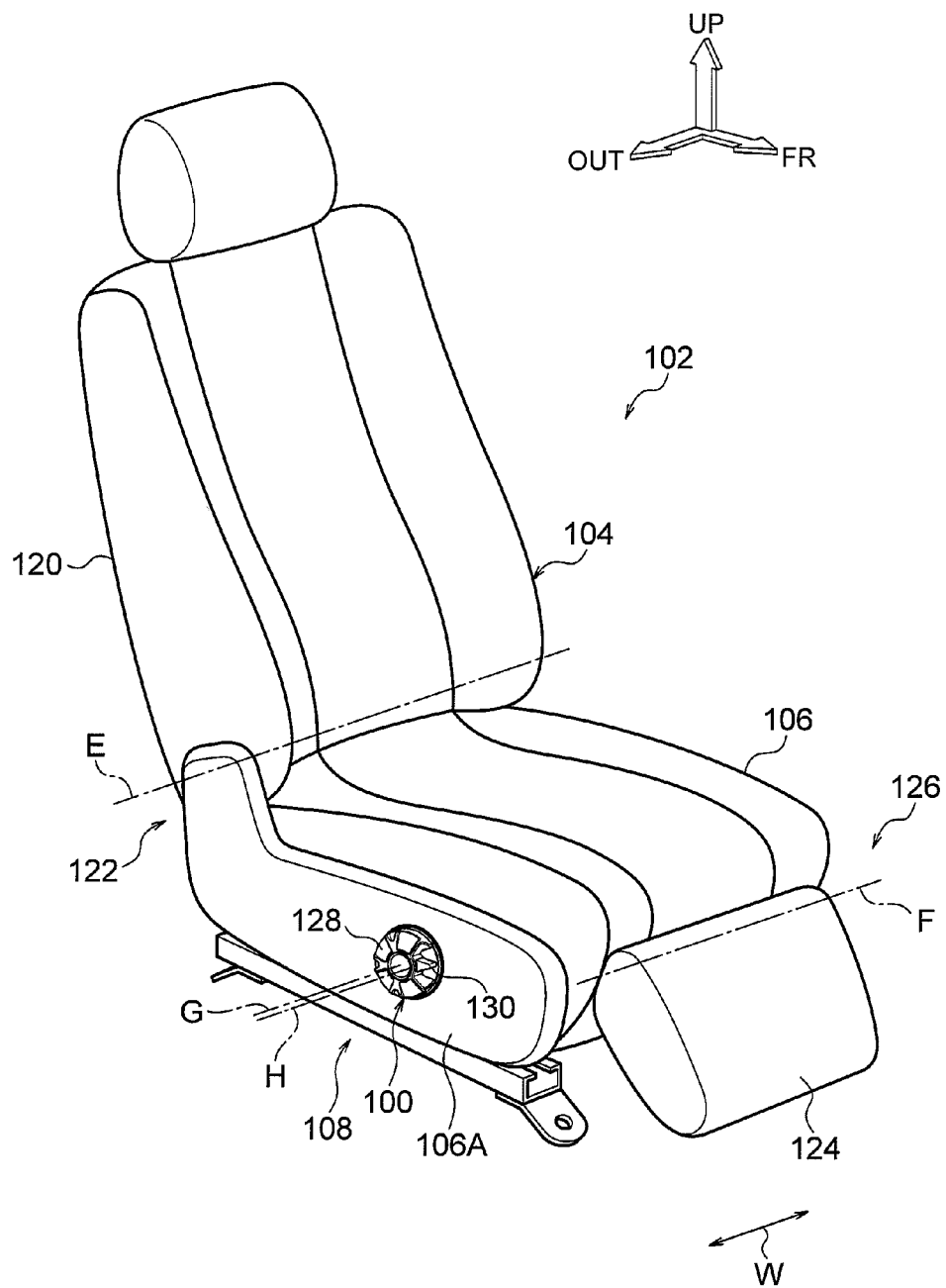
FIG. 1 is a perspective view of a power seat pertaining to a first embodiment of the present invention.
Figure 2A:
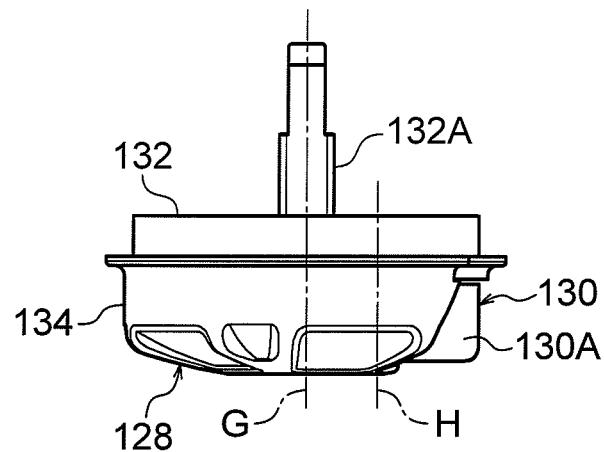
FIG. 2A and FIG. 2B show the configuration of a power seat operation device with which the same power seat device is equipped, with FIG. 2A being a front view and FIG. 2B being a bottom view.
Figure 2B:
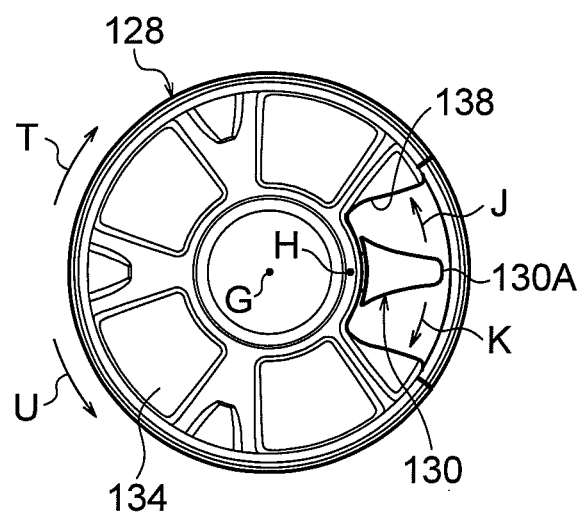
Figure 2C:
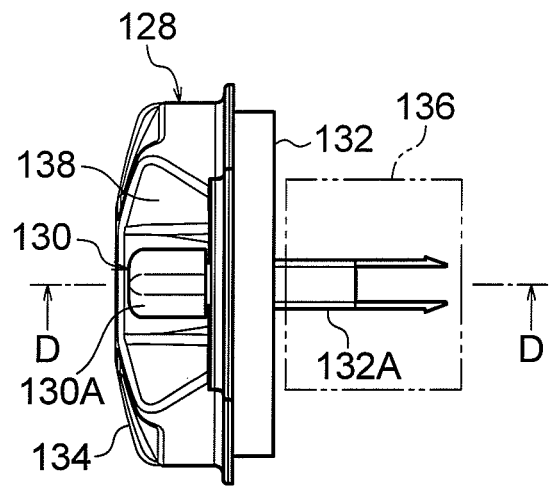
FIG. 2C and FIG. 2D show the configuration of the same power seat operation device, with FIG. 2C being a right side view and FIG. 2D being a sectional view along line D-D of FIG. 2C.
Figure 2D:
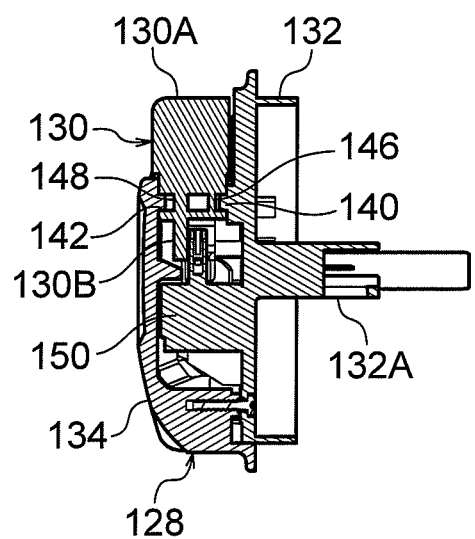
Figure 3:
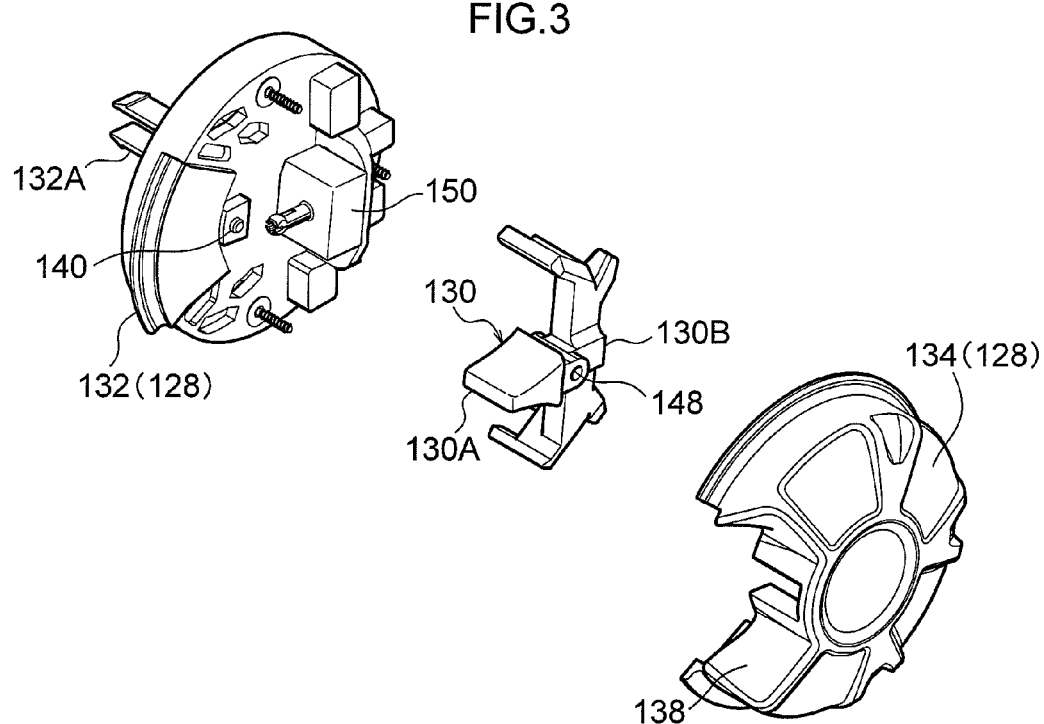
FIG. 3 is an exploded perspective view of the same power seat operation device.

A power seat operation device 100 and a power seat (an electrically powered seat for a vehicle) 102 pertaining to a first embodiment of the present invention will be described below using FIG. 1 to FIG. 13. Arrow FR appropriately shown in the drawings indicates a vehicle frontward direction, arrow UP indicates a vehicle upward direction, arrow OUT indicates outward in a vehicle width direction, and arrow W indicates the vehicle width direction. Furthermore, in the present embodiment, the front and rear and up and down directions and the width direction (right and left direction) of the power seat 102 coincide with the front and rear and up and down directions and the width direction (right and left direction) of the vehicle, respectively.

(Configuration)

As shown in FIG. 1, the power seat 102 pertaining to the present embodiment is equipped with a seat body 104. The seat body 104 is equipped with a seat sliding mechanism 108 that causes a seat cushion 106 to slide in the seat front and rear direction relative to a non-illustrated vehicle body floor portion, a recliner mechanism 122 that causes a seat back 120 to turn about a turning axis E along the seat width direction relative to the seat cushion 106, and an ottoman mechanism 126 that causes an ottoman 124 to turn about a turning axis F along the seat width direction relative to the seat cushion 106. These mechanisms are all moving mechanisms and drive moving parts (the seat cushion 106, the seat back 120, and the ottoman 124) of the seat body 104 using the driving force of non-illustrated motors.

Furthermore, in the power seat 102, the power seat operation device 100 (hereinafter simply called "the operation device 100") is disposed on a side portion 106A on the vehicle width direction outside of the seat cushion 106. The operation device 100 is for selectively activating the seat sliding mechanism 108, the recliner mechanism 122, and the ottoman mechanism 126 and, as shown in FIG. 2A to FIG. 2D, FIG. 3, and FIG. 4, is equipped with a dial member 128 that serves as a selection operation member and a switch member 130 that serves as an activation operation member.

The dial member 128 is configured by a base 132 that is formed in a substantially discoid shape and a cover 134 that is formed in a substantially bottomed cylindrical shape whose axial direction dimension is short. The cover 134 is attached to one axial direction end side of the base 132, and overall the dial member 128 is formed in a substantially cylindrical shape that is hollow and whose axial direction dimension is short. The dial member 128 is disposed on the side portion 106A of the seat cushion 106 in a state in which the base 132 faces inward in the seat width direction. The dial member 128 is supported in such a way as to be turnable about a rotational axis G along the seat width direction relative to the seat cushion 106 and can be operated by being manually turned by a seated person seated in the power seat 102.

A coupling shaft 132A that projects inward in the seat width direction (the opposite side of the cover 134) is disposed in the central portion of the base 132. A non-illustrated input shaft of a rotary switch 136 (see FIG. 2C) disposed in the side portion 106A of the seat cushion 106 is coaxially coupled to, in such a way as to be integrally rotatable with, the coupling shaft 132A. The motors of the seat sliding mechanism 108, the recliner mechanism 122, and the ottoman mechanism 126 are electrically connected to the rotary switch 136. The turning operation of the dial member 128 (see arrow T and arrow U in FIG. 2B) is a selection operation that selects a moving mechanism that becomes a target of operation from among the above-described plural moving mechanisms.

Furthermore, the outer peripheral portion of the dial member 128 is formed in the shape of a cylindrical surface along a virtual circle centered on the turning axis G, and a recessed portion 138 is formed on the outer peripheral side of the cover 134. The recessed portion 138 is formed in a substantially trapezoidal shape as seen from the seat width direction and is open at the outer peripheral portion and one axial direction end portion (the vehicle width direction outside end portion) of the dial member 128. The recessed portion 138 corresponds to the switch member 130.

The switch member 130 is disposed between the base 132 and the cover 134. Circular holes 146 and 148 into which cylindrical projections 140 and 142 disposed on the base 132 and the cover 134 are fitted are formed in the switch member 130. The projections 140 and 142 and the circular holes 146 and 148 are disposed coaxially with a turning axis H along the seat width direction, and the switch member 130 is attached in such a way as to be turnable about the turning axis H relative to the dial member 128.

The switch member 130 has an operation portion 130A that is disposed in the recessed portion 138 and a coupling portion 130B that is disposed in the dial member 128. The distal end portion of the operation portion 130A projects outside the recessed portion 138, and the seated person gripping the dial member 128 can operate the operation portion 130A by turning it using the thumb or the index finger, for example. Furthermore, the coupling portion 130B is disposed on the opposite side of the operation portion 130A via the turning axis H and is coupled to an input portion of a switch body 150 disposed in the dial member 128.

The switch body 150 is for turning on and off the motors of the seat sliding mechanism 108, the recliner mechanism 122, and the ottoman mechanism 126 and selecting the rotational directions of the motors and is fixed to the base 132. The switch body 150 uses a non-illustrated urging member to urge the switch member 130 toward a neutral position (the position shown in FIG. 1 and FIG. 2A to FIG. 2D), and the switch member 130 can be operated by turning it to one side (the direction of arrow J in FIG. 2B) and the other side (the direction of arrow K in FIG. 2B) of the neutral position relative to the dial member 128. Additionally, the turning operation of the switch member 130 (see arrow J and arrow K in FIG. 2B) is an activation operation that activates the moving mechanism selected by the selection operation.

Figure 5A:
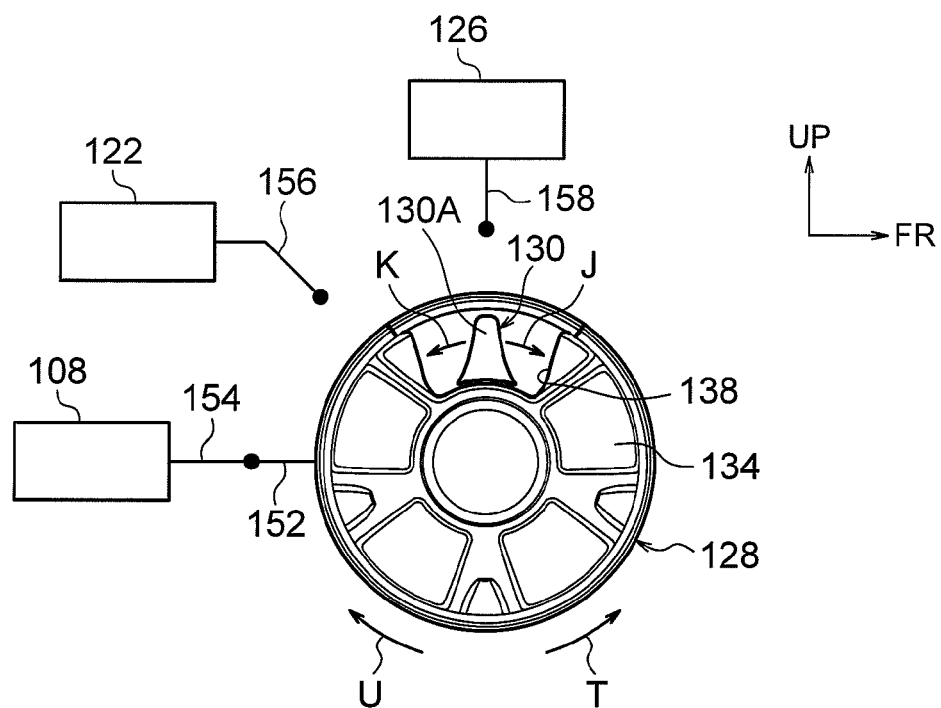
FIG. 5A is a drawing for describing a state in which a dial member of the same power seat operation device is disposed in a position for selecting a seat sliding mechanism.
Figure 5B:
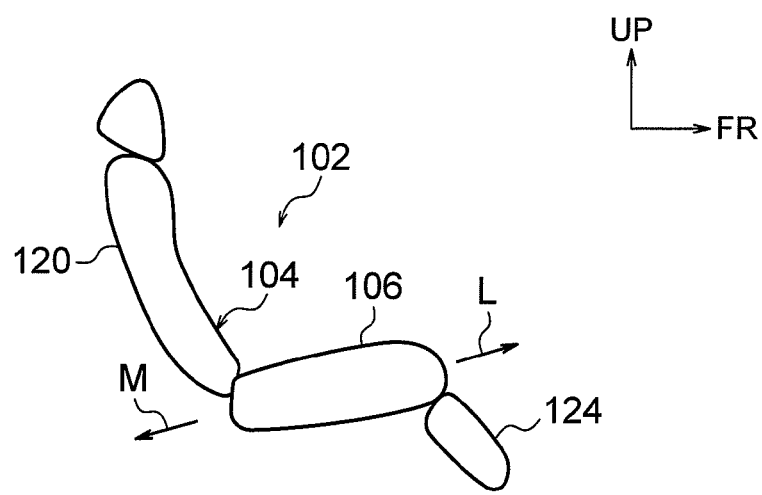
FIG. 5B is a drawing for describing actual directions in which a seat cushion is moved by the activation of the seat sliding device.

Here, in the operation device 100 having the above-described configuration, as shown in FIG. 5A, in a state in which the dial member 128 has been operated by being turned to a position in which the operation portion 130A of the switch member 130 is above the center (the turning axis G) of the dial member 128, the operational directions (the direction of arrow J and the direction of arrow K in FIG. 5A) of the operation portion 130A are along the vehicle front and rear direction. Furthermore, in this state, a dial-side contact 152 of the rotary switch 136 is connected to a motor-side contact 154 connected to the motor of the seat sliding mechanism 108, and the seat sliding mechanism 108 is selected as the target of operation. In this state, when the operation portion 130A of the switch member 130 is operated in the direction of arrow J in FIG. 5A, the motor of the seat sliding mechanism 108 forwardly rotates and the seat cushion 106 slides toward the seat front side (the direction of arrow L in FIG. 5B) relative to the vehicle body floor portion. Furthermore, when the operation portion 130A of the switch member 130 is operated in the direction of arrow K in FIG. 5A, the motor of the seat sliding mechanism 108 reversely rotates and the seat cushion 106 slides toward the seat rear side (the direction of arrow M in FIG. 5B) relative to the vehicle body floor portion.

Figure 6A:
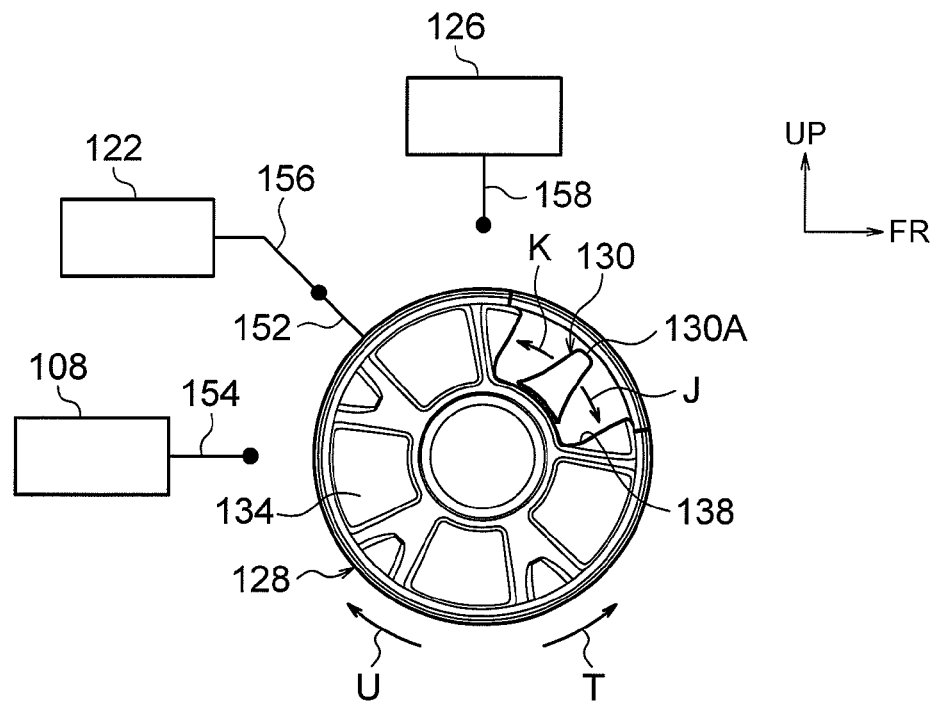
FIG. 6A is a drawing for describing a state in which the dial member of the same power seat operation device is disposed in a position for selecting a recliner mechanism.
Figure 6B:
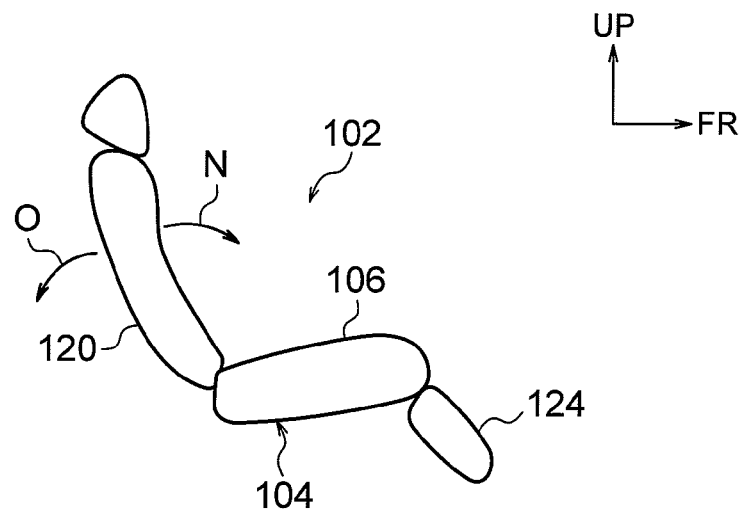
FIG. 6B is a drawing for describing actual directions in which a seat back is moved by the activation of the recliner mechanism.

As shown in FIG. 6A, in a state in which the dial member 128 has been operated by being turned to a position in which the operation portion 130A of the switch member 130 is disposed on the seat front side of and obliquely above the center (the turning axis G) of the dial member 128, the operational directions (the direction of arrow J and the direction of arrow K in FIG. 6A) of the operation portion 130A are along a direction slanted down in front (a direction slanted up in back) relative to the vehicle front and rear direction. The position of the dial member 128 is a position in which the dial member 128 has been rotated 45 degrees from the position shown in FIG. 5A to one side about the turning axis G. Furthermore, in this state, the dial-side contact 152 of the rotary switch 136 is connected to a motor-side contact 156 connected to the motor of the recliner mechanism 122, and the recliner mechanism 122 is selected as the target of operation. In this state, when the operation portion 130A of the switch member 130 is operated in the direction of arrow J in FIG. 6A, the motor of the recliner mechanism 122 forwardly rotates and the seat back 120 turns toward the seat front side (the direction of arrow N in FIG. 6B) relative to the seat cushion 106. Furthermore, when the operation portion 130A of the switch member 130 is operated in the direction of arrow K in FIG. 6A, the motor of the recliner mechanism 122 reversely rotates and the seat back 120 turns toward the seat rear side (the direction of arrow O in FIG. 6B) relative to the seat cushion 106.

Figure 7A:
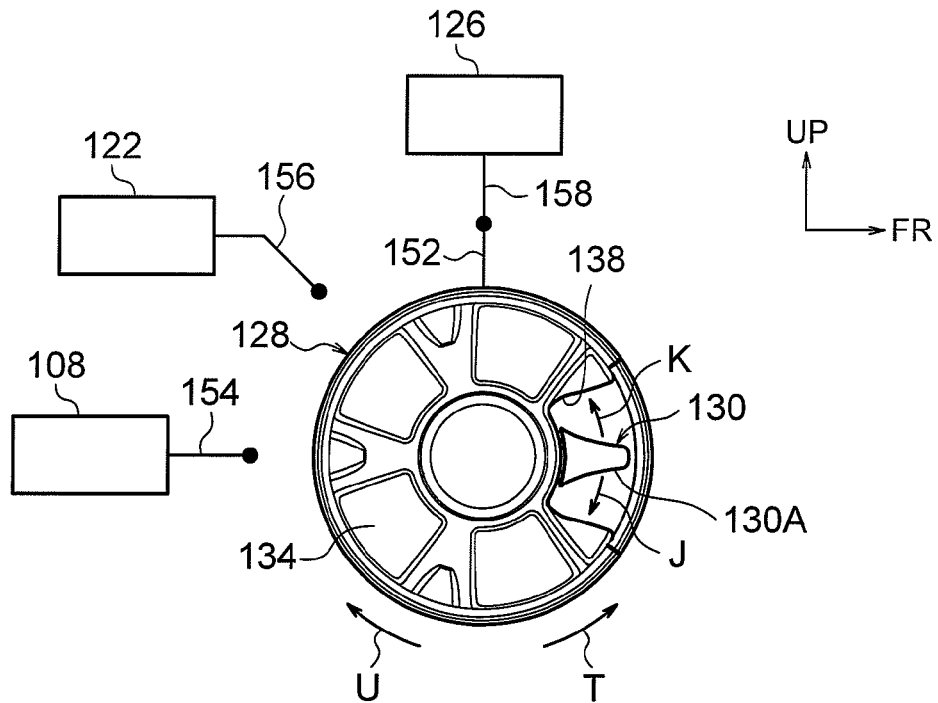
FIG. 7A is a drawing for describing a state in which the dial member of the same power seat operation device is disposed in a position for selecting an ottoman mechanism.
Figure 7B:
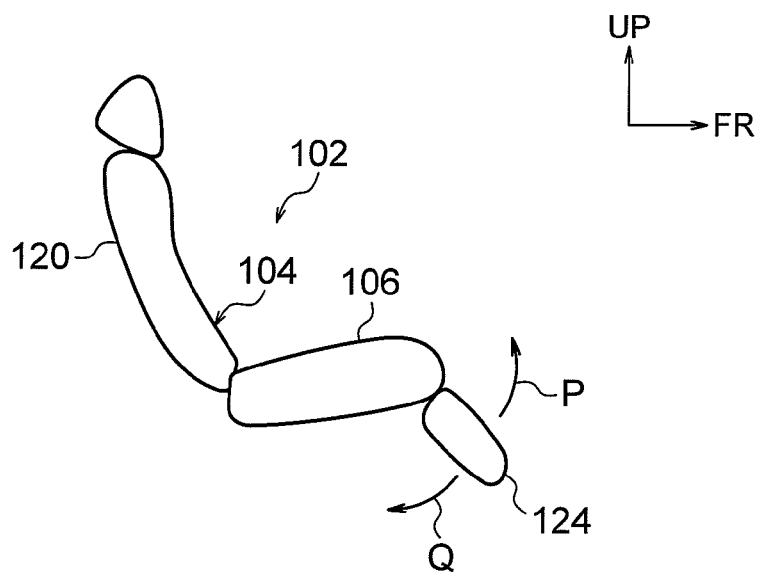
FIG. 7B is a drawing for describing actual directions in which an ottoman is moved by the activation of the ottoman mechanism.

Furthermore, as shown in FIG. 7A, in a state in which the dial member 128 has been operated by being turned to a position in which the operation portion 130A of the switch member 130 is disposed on the seat front side of the center (the turning axis G) of the dial member 128, the operational directions (the direction of arrow J and the direction of arrow K in FIG. 7A) of the operation portion 130A are along the vehicle up and down direction. The position of the dial member 128 is a position in which the dial member 128 has been rotated 45 degrees from the position shown in FIG. 6A to one side about the turning axis G. Furthermore, in this state, the dial-side contact 152 of the rotary switch 136 is connected to a motor-side contact 158 connected to the motor of the ottoman mechanism 126, and the ottoman mechanism 126 is selected as the target of operation. In this state, when the operation portion 130A of the switch member 130 is operated in the direction of arrow K in FIG. 7A, the motor of the ottoman mechanism 126 forwardly rotates and the ottoman 124 turns upward (the direction of arrow P in FIG. 7B) relative to the seat cushion 106. Furthermore, when the operation portion 130A of the switch member 130 is operated in the direction of arrow J in FIG. 7A, the motor of the ottoman mechanism 126 reversely rotates and the ottoman 124 turns downward (the direction of arrow Q in FIG. 7B) relative to the seat cushion 106. The moving mechanisms are activated, and the activation amounts of the moving parts are adjusted, in accordance with the amount of time in which the operation portion 130A of the switch member 130 is operated.

(Action and Effects)

Next, the action and effects of the present embodiment will be described.

In the power seat 102 having the above-described configuration, when the dial member 128 of the operation device 100 is operated by being turned relative to the seat cushion 106, a moving mechanism that becomes a target of operation is selected from among the seat sliding mechanism 108, the recliner mechanism 122, and the ottoman mechanism 126 disposed in the power seat 102. Additionally, when the switch member 130 is operated by being turned relative to the dial member 128, the selected moving mechanism is activated. Because of this, the plural moving mechanisms can be selectively operated.

Moreover, in the present embodiment, the switch member 130 is operated by being turned relative to the dial member 128, and the turning axis H of the switch member 130 relative to the dial member 128 is along the seat width direction. Because of this, the operational directions of the switch member 130 can be made to resemble the actual directions (the direction of arrow N and the direction of arrow O in FIG. 6B) in which the seat back 120 is moved by the activation of the recliner mechanism 122 and the actual directions (the direction of arrow P and the direction of arrow Q in FIG. 7B) in which the ottoman 124 is moved by the activation of the ottoman mechanism 126. Because of this, intuitive operation becomes possible. Furthermore, in a state in which the dial member 128 has been operated to the turning position in which the seat sliding mechanism 108 is selected as the target of operation (see FIG. 5A), the operational directions of the switch member 130 are along the actual directions (the seat front and rear direction) in which the seat cushion 106 is moved, so it can be ensured that the intuitive operational feeling with respect to the seat sliding mechanism 108 is not compromised.

Moreover, in the present embodiment, the turning operation of the dial member 128 and the turning operation of the switch member 130 can be performed in a series of motions, and these continuous operations can be performed smoothly using one hand and without having to shift to the other hand. Because of these, the operation device 100 has extremely good operability. Furthermore, there are one each of the dial member 128 that selects a target of operation from among the plural moving mechanisms and the switch member 130 that activates the selected moving mechanism, so it is not necessary to dispose a switch or the like for each moving mechanism. For this reason, the structure becomes simple and weight and costs can be reduced.

Furthermore, in the present embodiment, the dial member 128 has the outer peripheral portion along a virtual circle centered on the turning axis G of the dial member 28, so it becomes possible for the seated person to visually recognize that the dial member 128 is something that is operated by being turned. Furthermore, the operation portion 130A of the switch member 130 is disposed in the recessed portion 138 that is open at the outer peripheral portion and one axial direction end portion of the dial member 128, so erroneous activations caused by the switch member 130 being inadvertently operated can be prevented or deterred.

Figure 8A:
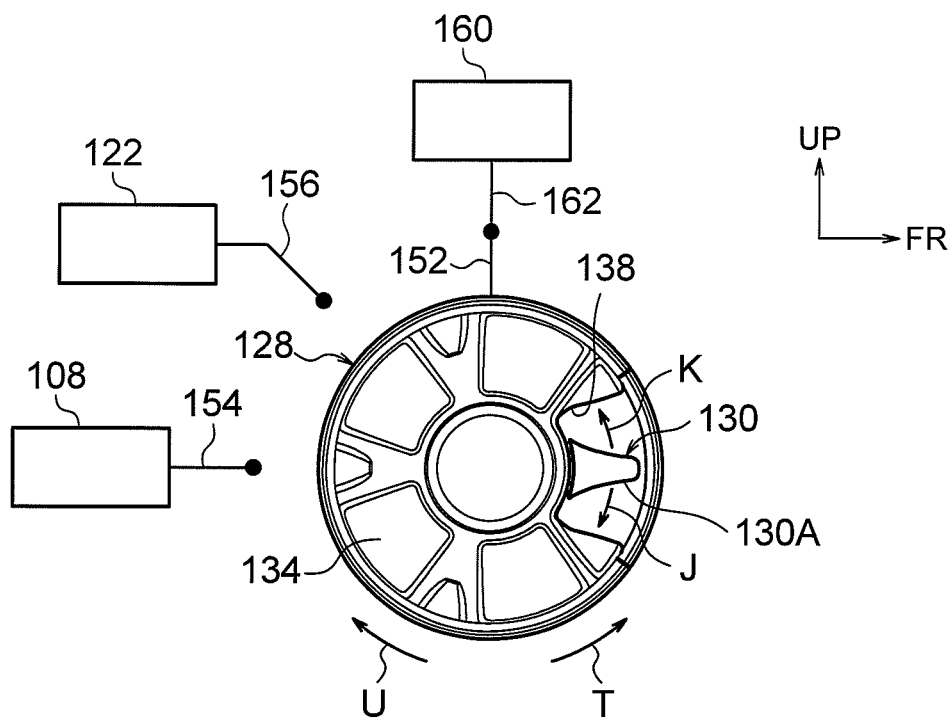
FIG. 8A is a drawing for describing a state in which the dial member of the power seat operation device pertaining to a first example modification of the first embodiment is disposed in a position for selecting a lifter mechanism.
Figure 8B:
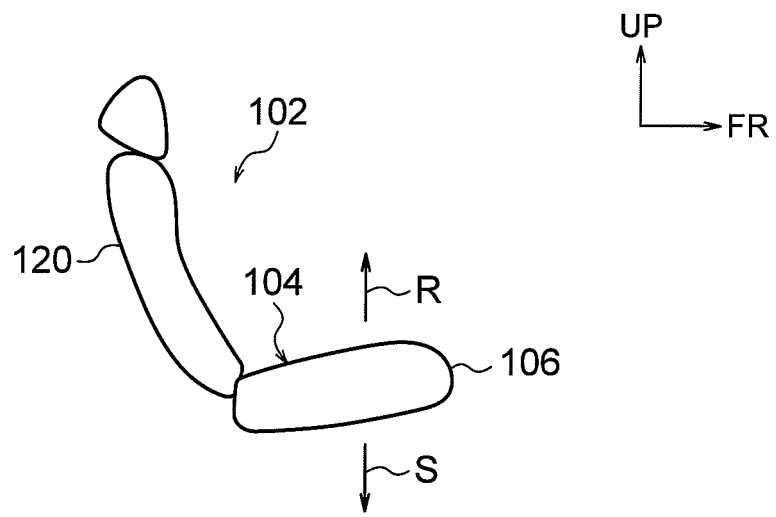
FIG. 8B is a drawing for describing actual directions in which the seat cushion is moved by the activation of the lifter mechanism.

In the first embodiment, the ottoman mechanism 126 is disposed in the power seat 12, but the present invention is not limited to this; as shown in FIG. 8A, a lifter mechanism 160 that causes the seat cushion 106 to move up and down relative to the vehicle body floor portion may also be disposed instead of the ottoman mechanism 126. In that case, for example, in a state in which the dial member 128 has been operated by being turned to a position (the position shown in FIG. 8A) in which the operational directions of the operation portion 130A of the switch member 130 are along the seat up and down direction, the dial-side contact 152 of the rotary switch 136 is connected to a motor-side contact 162 connected to a motor of the lifter mechanism 160. Because of this, the lifter mechanism 160 is selected as the target of operation. In this state, when the operation portion 130A of the switch member 130 is operated in the direction of arrow K in FIG. 8A, the motor of the lifter mechanism 160 forwardly rotates and the seat cushion 106 moves upward (the direction of arrow R in FIG. 8B) relative to the vehicle body floor portion. Furthermore, when the operation portion 130A of the switch member 130 is operated in the direction of arrow J in FIG. 8A, the motor of the lifter mechanism 160 reversely rotates and the seat cushion 106 turns downward (the direction of arrow S in FIG. 8B) relative to the vehicle body floor portion. In this configuration, the operational directions of the switch member 130 are along the actual directions in which the seat cushion 106 is moved by the activation of the lifter mechanism 160, so it can be ensured that the intuitive operational feeling with respect to the lifter mechanism 160 is not compromised.

Figure 9A:
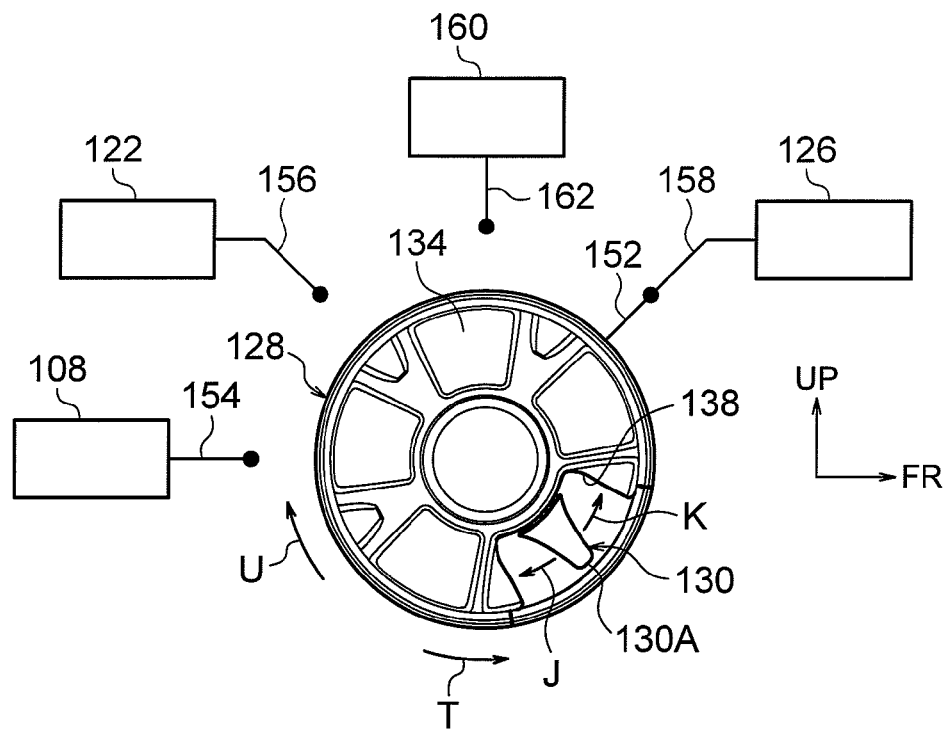
FIG. 9A is a drawing for describing a state in which the dial member of the power seat operation device pertaining to a second example modification of the first embodiment is disposed in a position for selecting the ottoman mechanism.
Figure 9B:
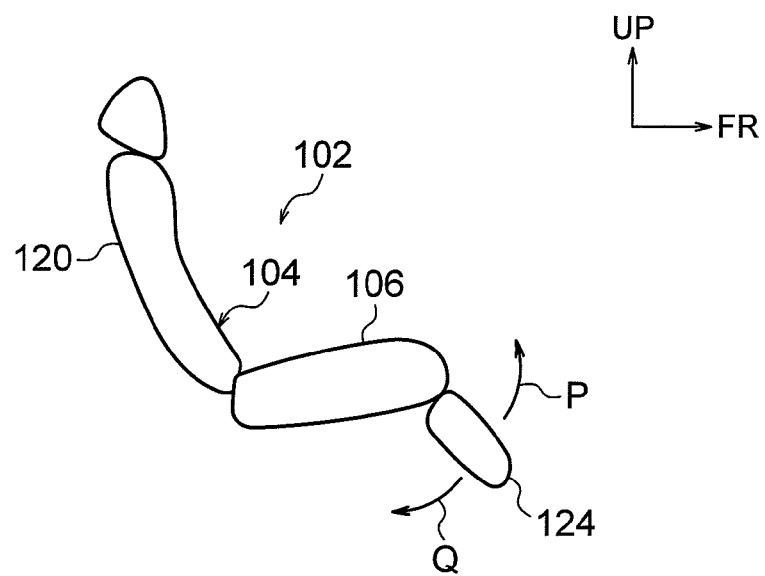
FIG. 9B is a drawing for describing actual directions in which the ottoman is moved by the activation of the ottoman mechanism.
Figure 10A:
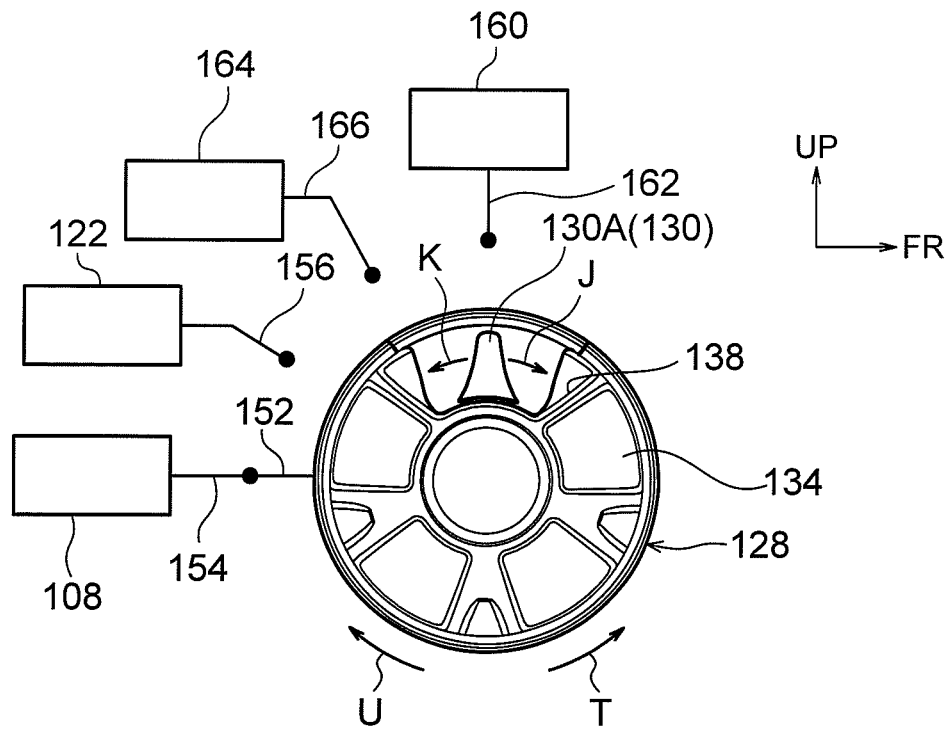
FIG. 10A is a drawing for describing a state in which the dial member of the power seat operation device pertaining to a third example modification of the first embodiment is disposed in a position for selecting the seat sliding mecha-nism.
Figure 10B:
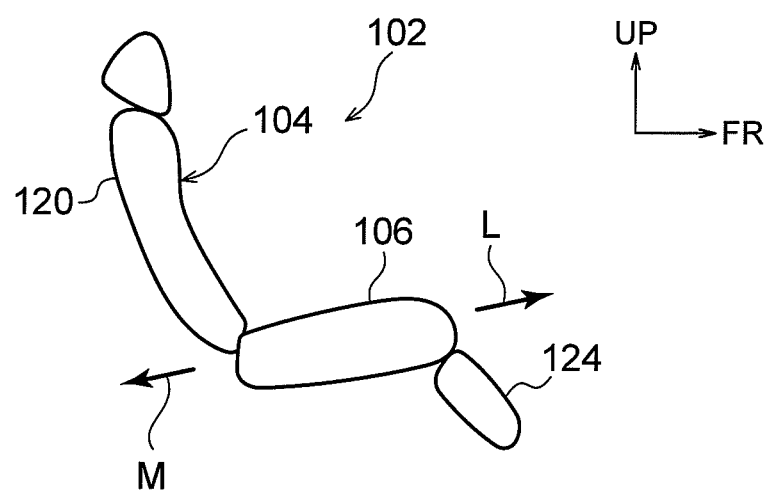
FIG. 10B is a drawing for describing actual directions in which the seat cushion is moved by the activation of the seat sliding mechanism.
Figure 11A:
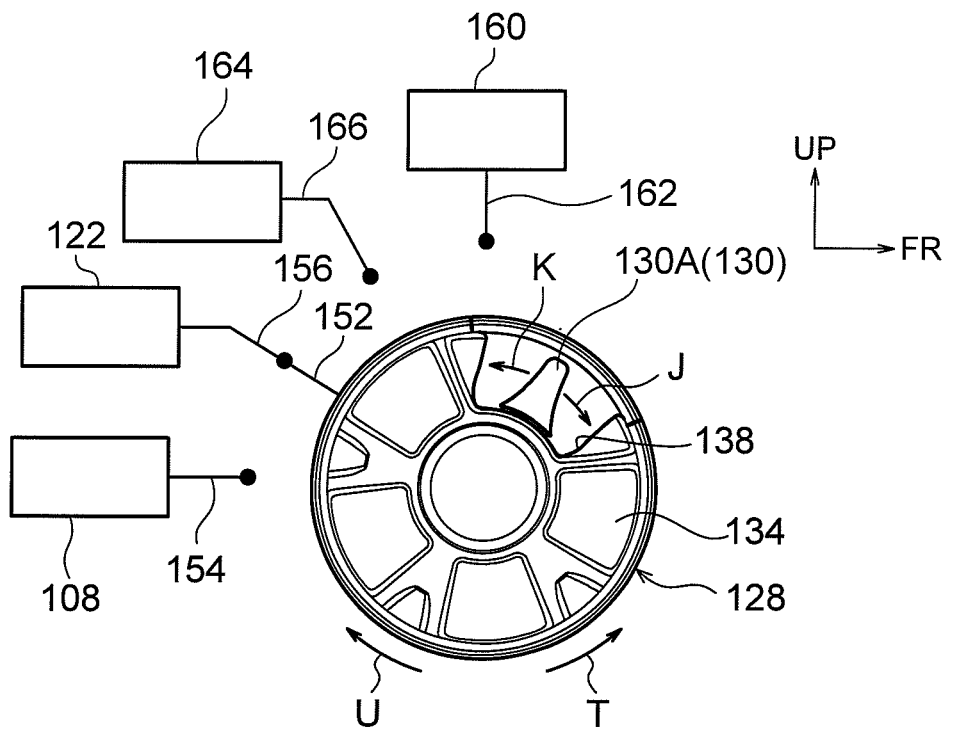
FIG. 11A is a drawing for describing a state in which the dial member of the same power seat operation device is disposed in a position for selecting the recliner mechanism.
Figure 11B:
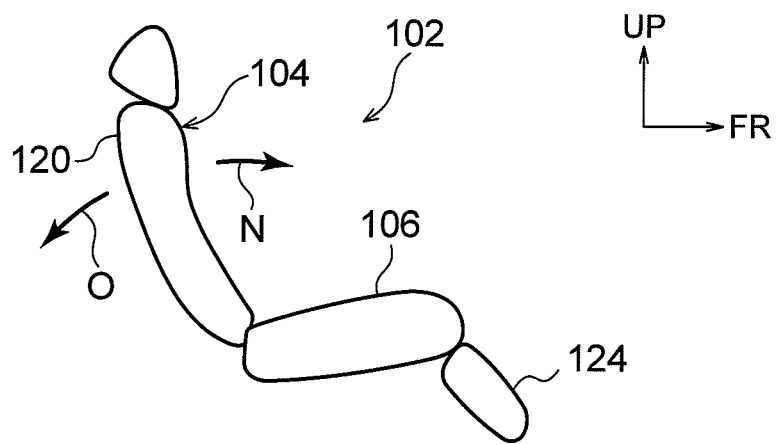
FIG. 11B is a drawing for describing actual directions in which the seat back is moved by the activation of the recliner mechanism.
Figure 12A:
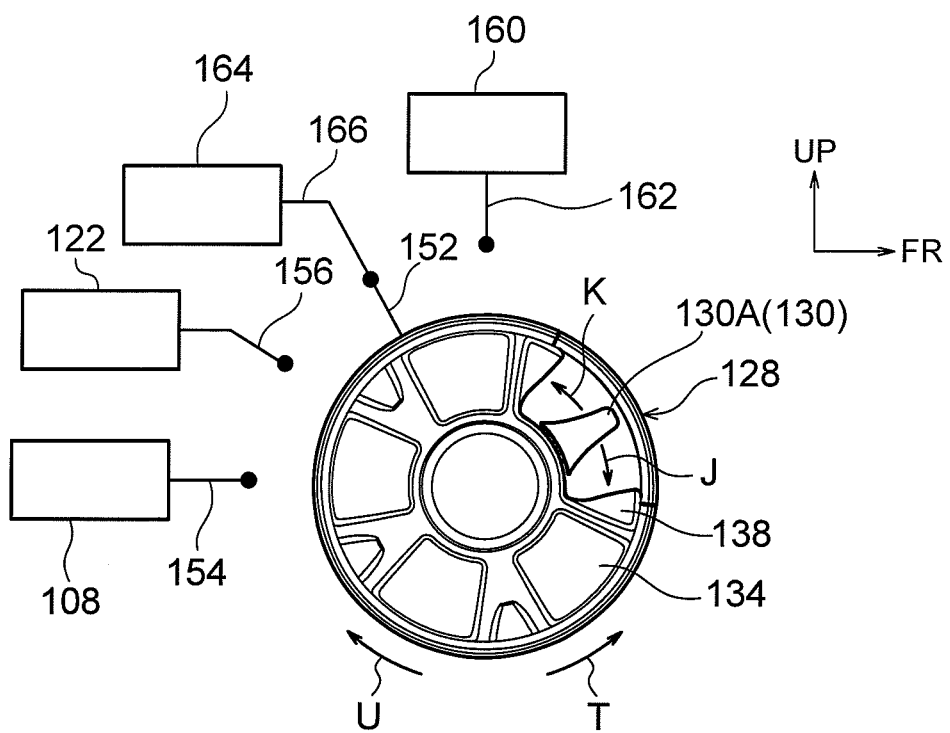
FIG. 12A is a drawing for describing a state in which the dial member of the same power seat operation device is disposed in a position for selecting a tilt mechanism.
Figure 12B:
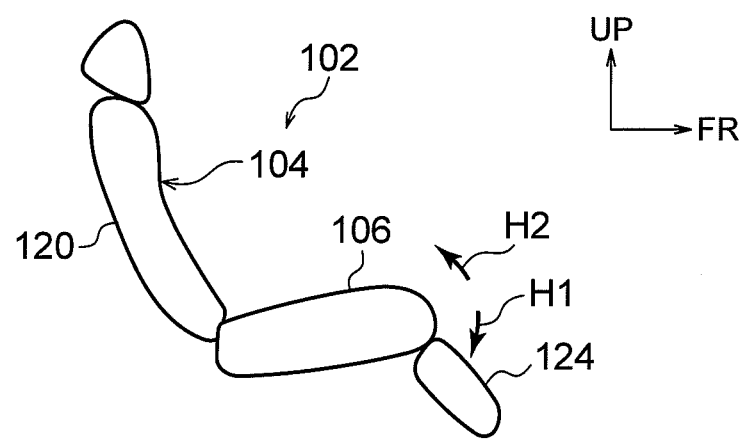
FIG. 12B is a drawing for describing actual directions in which the seat cushion is moved by the activation of the tilt mechanism.
Figure 13A:
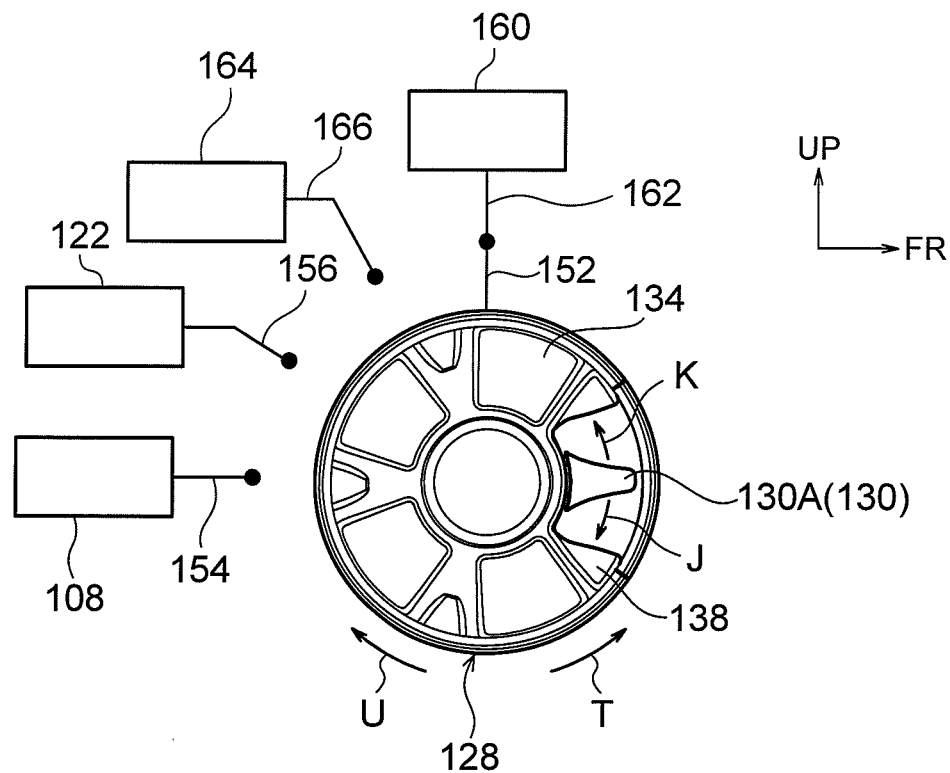
FIG. 13A is a drawing for describing a state in which the dial member of the same power seat operation device is disposed in a position for selecting the lifter mechanism.
Figure 13B:
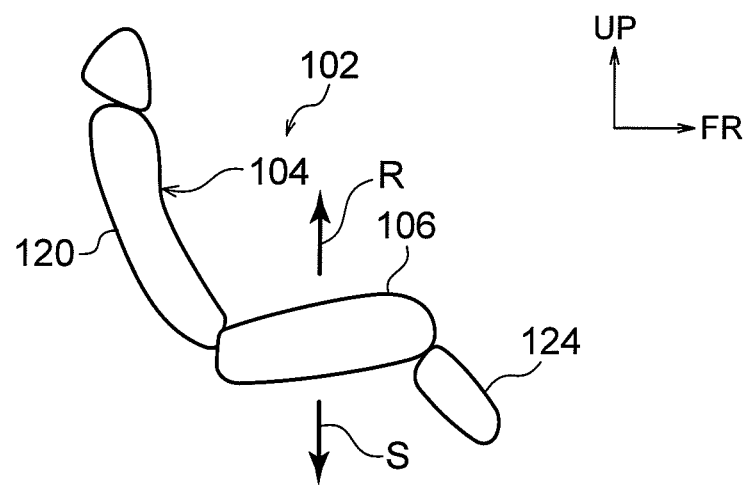
FIG. 13B is a drawing for describing actual directions in which the seat cushion is moved by the activation of the lifter mechanism.

Furthermore, as shown in FIG. 9A, both the lifter mechanism 160 and the ottoman mechanism 126 may be disposed in the power seat 102. In that case, for example, the lifter mechanism 160 is operated by the same method of operation as the configuration shown in FIG. 8A and FIG. 8B. Furthermore, for example, as shown in FIG. 9A, in a state in which the dial member 128 has been operated by being turned to a position (the position shown in FIG. 9A) in which the operational directions of the operation portion 130A of the switch member 130 are along a direction slanted up in front relative to the seat front and rear direction, the dial-side contact 152 of the rotary switch 136 is connected to the motor-side contact 158 connected to the motor of the ottoman mechanism 126. Because of this, the ottoman mechanism 126 is selected as the target of operation. In this state, when the operation portion 130A of the switch member 130 is operated in the direction of arrow K in FIG. 9A, the motor of the ottoman mechanism 126 forwardly rotates and the ottoman 124 turns upward (the direction of arrow P in FIG. 9B) relative to the seat cushion 106. Furthermore, when the operation portion 130A of the switch member 130 is operated in the direction of arrow J in FIG. 9A, the motor of the ottoman mechanism 126 reversely rotates and the ottoman 124 turns downward (the direction of arrow Q in FIG. 9B) relative to the seat cushion 106.

Furthermore, in the first embodiment, the turning operation positions of the dial member 128 are set every 45 degrees, but the present invention is not limited to this; as shown in FIG. 10A, FIG. 11A, FIG. 12A, and FIG. 13A, the turning operation positions of the dial member 128 may also be set every 30 degrees. In this example, the plural moving mechanisms include a tilt mechanism 164 that causes the front portion of the seat cushion 106 to move up and down relative to the vehicle body floor portion.

In this example, when the dial member 128 is operated by being turned to a first position (the position shown in FIG. 10A) in which the operational directions of the operation portion 130A of the switch member 130 are along the seat front and rear direction, the dial-side contact 152 of the rotary switch 136 is connected to the motor-side contact 154 connected to the motor of the seat sliding mechanism 108. Because of this, the seat sliding mechanism 108 is selected as the target of operation. In this state, when the operation portion 130A of the switch member 130 is operated, the seat cushion 106 moves in the same way as described in conjunction with FIG. 5B (see FIG. 10B).

Furthermore, in this example, when the dial member 128 is operated by being turned to a third position (the position shown in FIG. 11A) in which the operational directions of the operation portion 130A of the switch member 130 are along a direction slanted down in front relative to the seat front and rear direction, the dial-side contact 152 of the rotary switch 136 is connected to the motor-side contact 156 connected to the motor of the recliner mechanism 122. Because of this, the recliner mechanism 122 is selected as the target of operation. In this state, when the operation portion 130A of the switch member 130 is operated, the seat back 120 moves in the same way as described in conjunction with FIG. 6B (see FIG. 11B). In this case, the operational directions of the switch member 130 coincide with or resemble the actual directions (the direction of arrow N and the direction of arrow O in FIG. 11B) in which the seat back 120 is moved by the activation of the recliner mechanism 122, so intuitive operation with respect to the recliner mechanism 122 becomes possible.

Furthermore, in this example, when the dial member 128 is operated by being turned to a fourth position (the position shown in FIG. 12A) in which the operational directions of the operation portion 130A of the switch member 130 are along a direction slanted further down in front than the third position relative to the seat front and rear direction, the dial-side contact 152 of the rotary switch 136 is connected to a motor-side contact 166 connected to a motor of the tilt mechanism 164. Because of this, the tilt mechanism 164 is selected as the target of operation. In this state, when the operation portion 130A of the switch member 130 is operated in the direction of arrow K in FIG. 12A, the motor of the tilt mechanism 164 forwardly rotates and the front portion of the seat cushion 106 moves upward (the direction of arrow H2 in FIG. 12B) relative to the vehicle body floor portion. Furthermore, when the operation portion 130A of the switch member 130 is operated in the direction of arrow J in FIG. 12A, the motor of the tilt mechanism 164 reversely rotates and the front portion of the seat cushion 106 turns downward (the direction of arrow H1 in FIG. 12B) relative to the vehicle body floor portion. In this case, the operational directions of the switch member 130 are along the actual directions (the direction of arrow H1 and the direction of arrow H2 in FIG. 12B) in which the front portion of the seat cushion 106 is moved by the activation of the tilt mechanism 164, so it can be ensured that the intuitive operational feeling with respect to the tilt mechanism 164 is not compromised. The third position for the recliner mechanism 122 and the fourth position for the tilt mechanism 164 may also be reversed (so that the third position is for the tilt mechanism 164 and the fourth position is for the recliner mechanism 122).

Moreover, in this example, when the dial member 128 is operated by being turned to a second position (the position shown in FIG. 13A) in which the operational directions of the operation portion 130A of the switch member 130 are along the seat up and down direction, the dial-side contact 152 of the rotary switch 136 is connected to the motor-side contact 162 connected to the motor of the lifter mechanism 160. Because of this, the lifter mechanism 160 is selected as the target of operation. In this state, when the operation portion 130A of the switch member 130 is operated, the seat cushion 106 moves in the same way as described in conjunction with FIG. 8B (see FIG. 13B).

Furthermore, in the first embodiment, the motors that drive the plural moving mechanisms (the seat sliding mechanism 108, the recliner mechanism 122, and the ottoman mechanism 126) are disposed for each of the moving mechanisms, but the present invention is not limited to this. For example, output lines may be distributed to each of the moving mechanisms from one motor, and the moving mechanism to be activated may be switched by the operation device 100 using clutch mechanisms or the like to engage just one output line. In that case, the one motor is switched on and off and is forwardly and reversely rotated by the switch member 130. This will be described in detail in a tenth embodiment described below.

Next, other embodiments of the present invention will be described. The following embodiments take the first embodiment as their basic configuration, so regarding configurations and action that are basically the same as in the first embodiment, reference signs that are the same as those in the first embodiment will be assigned thereto and description thereof will be omitted.

Second Embodiment

Figure 14:
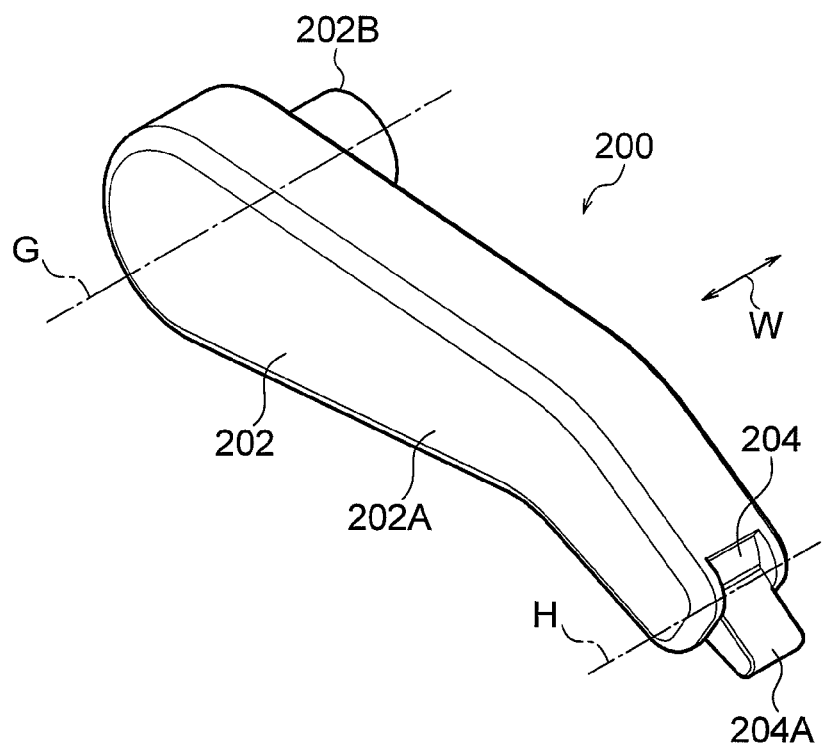
FIG. 14 is a perspective view of a power seat operation device pertaining to a second embodiment of the present invention.
Figure 15:
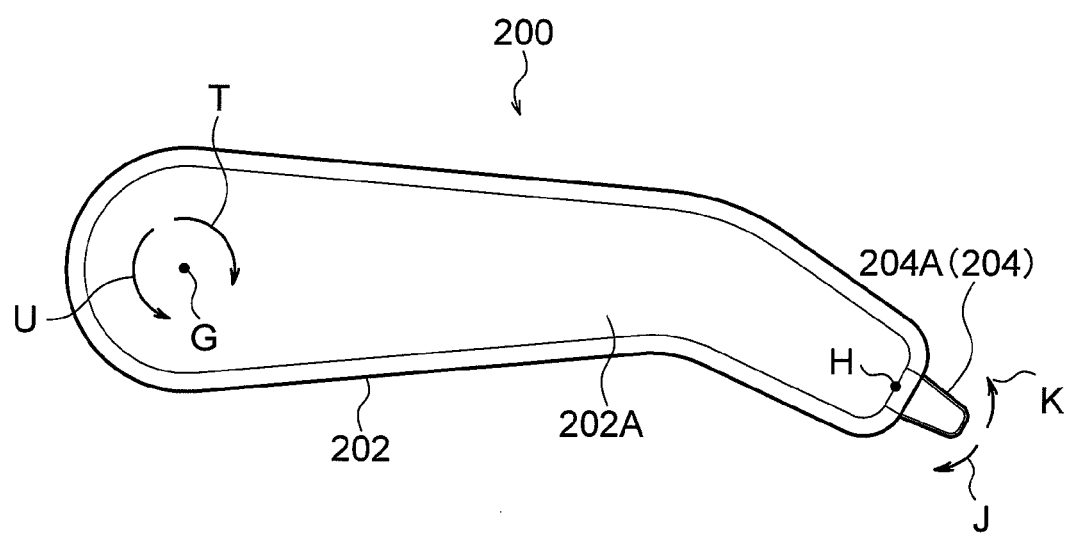
FIG. 15 is a side view of the same power seat operation device.

In FIG. 14, the configuration of a power seat operation device 200 pertaining to a second embodiment of the present invention is shown in a perspective view. Furthermore, in FIG. 15, the configuration of the same power seat operation device 200 is shown in a side view. The power seat operation device 200 is equipped with a lever member 202 that serves as a selection operation member. The level member 202 has a lever portion 202A that is formed in a long shape and extends in a direction orthogonal to a turning axis G of the lever member 202. A spindle portion 202B that projects inward in the seat width direction is disposed on the base end portion of the lever portion 202A, and the spindle portion 202B is rotatably supported on the side portion 106A of the seat cushion (not shown in FIG. 14 and FIG. 15). The lever member 202 is disposed in a state in which its turning axis G is along the seat width direction, and the lever member 202 can be operated by turning it about the turning axis G. The rotary switch 136 (not shown in FIG. 14 and FIG. 15) is coupled to the spindle portion 202B of the lever member 202. The turning operation of the lever member 202 (see arrow T and arrow U in FIG. 15) is a selection operation that selects a moving mechanism that becomes a target of operation from among plural moving mechanisms (here, the seat sliding mechanism 108, the recliner mechanism 122, and the ottoman mechanism 126).

A switch member 204 that serves as an activation operation member is attached to the distal end portion of the lever portion 202A. The switch member 204 basically has the same configuration as the switch member 204 pertaining to the first embodiment and is equipped with an operation portion 204A that projects from the distal end of the lever portion 202A and a non-illustrated coupling portion that is disposed in the lever portion 202A, and the coupling portion is coupled to an input portion of a non-illustrated switch body disposed in the lever portion 202A. The switch member 204 is attached in such a way as to be turnable about a turning axis H along the seat width direction relative to the lever member 202. The turning operation of the switch member 204 (see arrow J and arrow K in FIG. 15) is an activation operation that activates the selected moving mechanism.

Furthermore, in the present embodiment, the lever portion 202A is bent at its lengthwise direction middle portion in such a way that its distal end side extends obliquely downward toward the seat front side in a state in which the lengthwise direction on the base end side is along the seat front and rear direction.

In this embodiment, the seated person can grip the lever portion 202A and operate the level member 202 by turning it, so the operability of the lever member 202 (the selection operation member) can be made well. Furthermore, the switch member 204 is disposed on the distal end portion of the lever portion 202A, so the seated person can, for example, use the index finger of the hand gripping the lever portion 202A to operate the switch member 204 by turning it. Because of this, the operability of the switch member 204 can be made well. Moreover, in this lever member 202, the lever portion 202A is bent in such a way that the distal end side of the lever portion 202A heads obliquely downward toward the seat front side in a state in which the base end side of the lever portion 202A is along the seat front and rear direction. Because the lever portion 202A is bent in this way, operability when the seated person operates the switch member 204 with the index finger can be improved.

Third Embodiment

Figure 16:
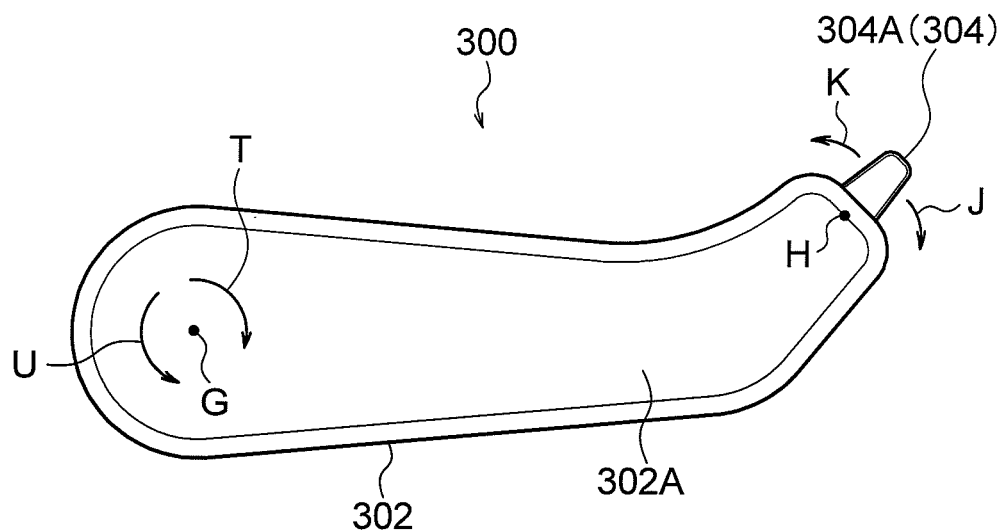
FIG. 16 is a side view of a power seat operation device pertaining to a third embodiment of the present invention.

In FIG. 16, the configuration of a power seat operation device 300 pertaining to a third embodiment of the present invention is shown in a side view. The power seat operation device 300 is equipped with a lever member 302 that serves as a selection operation member and a switch member 304 that serves as an activation operation member. The lever member 302 basically has the same configuration as the lever member 202 of the second embodiment and is equipped with a lever portion 302A and a non-illustrated spindle portion. However, the lever portion 302A of the lever member 302 is bent at its lengthwise direction middle portion in such a way that its distal end side extends obliquely upward toward the seat front side in a state in which the lengthwise direction on the base end side is along the seat front and rear direction. The switch member 304 has the same configuration as the switch member 204 of the second embodiment and is disposed on the distal end portion of the lever portion 302A.

In this embodiment, because the lever portion 302A is bent as described above, operability when, for example, the seated person uses the thumb of the hand gripping the lever portion 302A to operate the switch member 304 by turning it can be improved.

Fourth Embodiment

Figure 17:
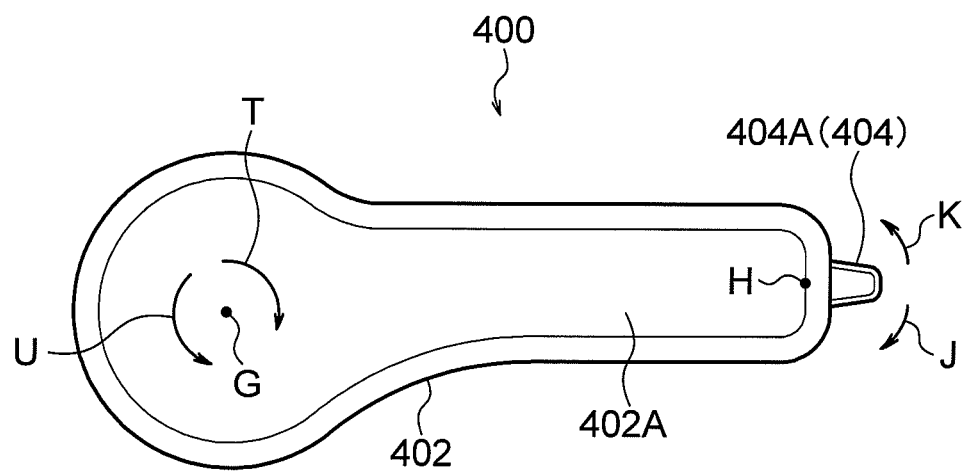
FIG. 17 is a side view of a power seat operation device pertaining to a fourth embodiment of the present invention.

In FIG. 17, the configuration of a power seat operation device 400 pertaining to a fourth embodiment of the present invention is shown in a side view. The power seat operation device 400 is equipped with a lever member 402 that serves as a selection operation member and a switch member 404 that serves as an activation operation member. The lever member 402 basically has the same configuration as the lever member 202 of the second embodiment and is equipped with a lever portion 402A and a non-illustrated spindle portion. However, the lever portion 402A of the lever member 402 is linearly formed. The switch member 404 has the same configuration as the switch member 204 of the second embodiment and is disposed on the distal end portion of the lever portion 402A.

In this embodiment, because the lever portion 402A is linearly formed, the seated person can, for example, operate the switch member 404 by turning it using whichever of the thumb and the index finger of the hand gripping the lever portion 402A can more easily operate the switch member 404 by turning it.

Fifth Embodiment

Figure 18:
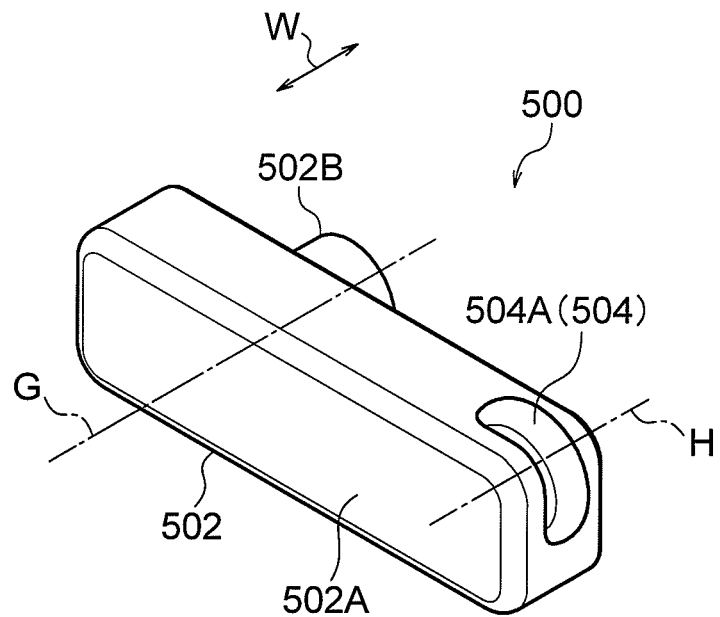
FIG. 18 is a perspective view of a power seat operation device pertaining to a fifth embodiment of the present invention.
Figure 19:
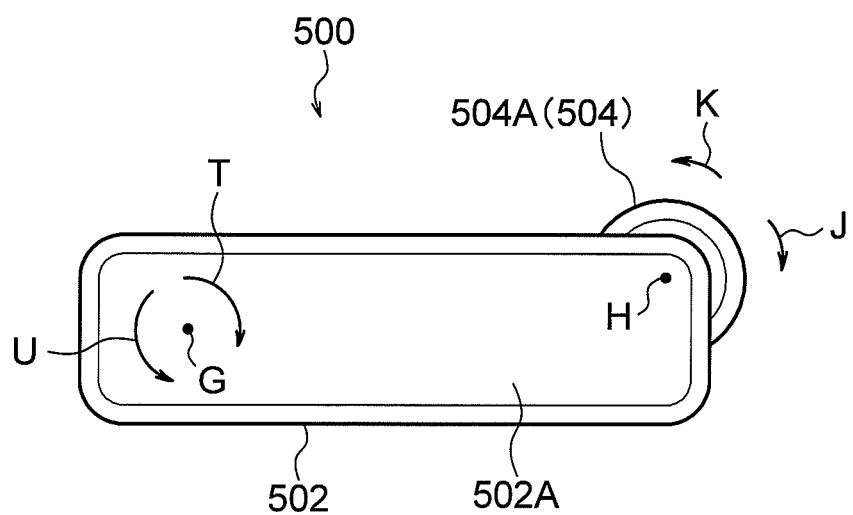
FIG. 19 is a side view of the same power seat operation device.

In FIG. 18, the configuration of a power seat operation device 500 pertaining to a fifth embodiment of the present invention is shown in a perspective view. Furthermore, in FIG. 19, the configuration of the same power seat operation device 500 is shown in a side view. The power seat operation device 500 is equipped with a lever member 502 that serves as a selection operation member and a switch member 504 that serves as an activation operation member. The lever member 502 basically has the same configuration as the lever member 202 of the second embodiment and is equipped with a lever portion 502A and a spindle portion 502B. However, the lever portion 502A of the lever member 502 is formed in a long rectangular shape as seen from the seat width direction.

The switch member 504 is a wheel switch formed in a discoid shape and is attached to a distal end corner portion of the lever portion 502A in a state in which an operation portion 504A set in part of the outer peripheral side of the switch member 504 projects outside the lever portion 502A. The switch member 504 is turnable about a turning axis H along the seat width direction relative to the lever member 502, and the turning operation of the switch member 504 (see arrow J and arrow K in FIG. 19) is an activation operation that activates the moving mechanism selected by the turning operation of the lever member 502.

In this embodiment, the seated person can, for example, operate the switch member 504 by turning it in a state in which the pad of the thumb of the hand gripping the lever portion 502A is pressed against the outer peripheral portion of the operation portion 504A of the switch member 504. Because of this, the turning operation of the switch member 504 can be performed in a manner akin to operating the wheel disposed in a computer mouse by turning it. Moreover, in contrast to the first to fourth embodiments, it is not necessary to hook a finger or the like on the switch member 504, so the operational feeling can be improved.

Sixth Embodiment

Figure 20:
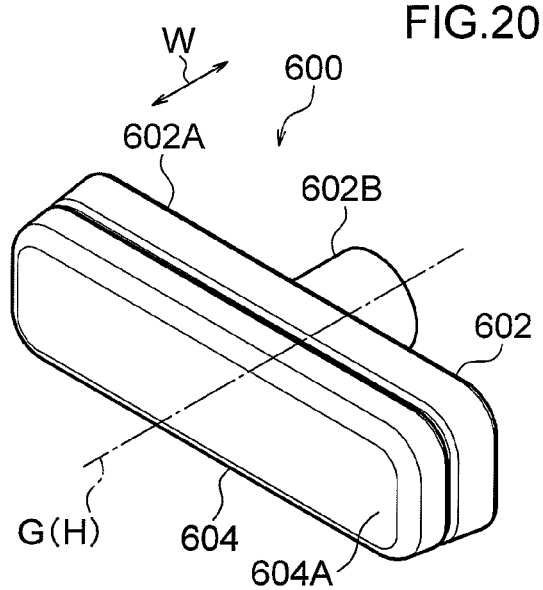
FIG. 20 is a perspective view of a power seat operation device pertaining to a sixth embodiment of the present invention.
Figure 21A:
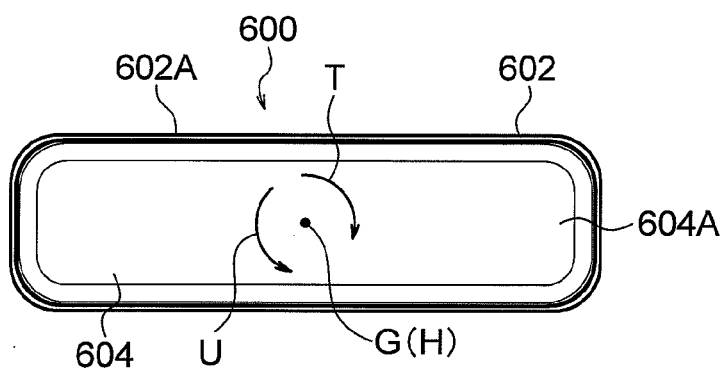
FIG. 21A and FIG. 21B are side view of the same power seat operation device, with FIG. 21A being a drawing for describing operational directions of a lever member and FIG. 21B being a drawing for describing operational directions of an operation portion of a switch member.
Figure 21B:
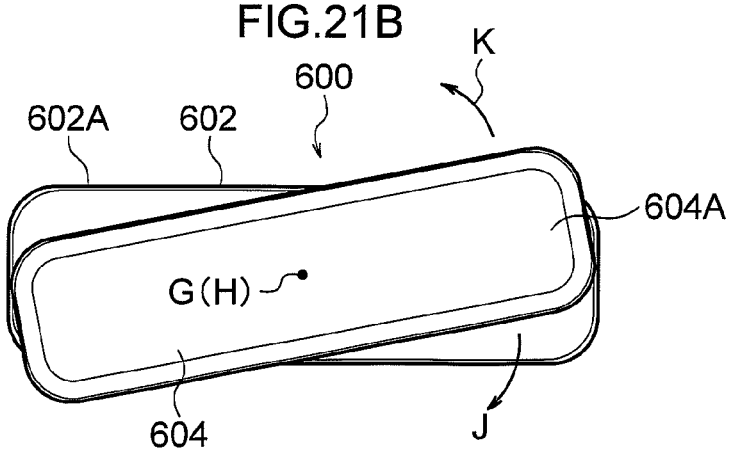

In FIG. 20, the configuration of a power seat operation device 600 pertaining to a sixth embodiment of the present invention is shown in a perspective view. Furthermore, in FIG. 21A and FIG. 21B, the configuration of the same power seat operation device 600 is shown in side views. The power seat operation device 600 is equipped with a lever member 602 that serves as a selection operation member and a switch member 604 that serves as an activation operation member. The lever member 602 is, like the lever member 202 of the second embodiment, equipped with a lever portion 602A and a spindle portion 602B. However, the lever portion 602A of the lever member 602 is formed in a long rectangular shape as seen from the seat width direction. Furthermore, the spindle portion 602B is disposed on the lengthwise direction central portion of the lever portion 602A. The turning operation of the lever member 602 (see arrow T and arrow U in FIG. 21A) is a selection operation that selects a moving mechanism that becomes a target of operation from among plural moving mechanisms.

On the other hand, the switch member 604 is formed in the same shape and size as the lever portion 602A and is disposed on one turning axis direction side (the seat width direction outside) of the lever member 602 relative to the lever member 602. The switch member 604 is attached to the lever member 602 in such a way as to be turnable about a turning axis H that is the same as a turning axis G of the lever member 602, and the turning operation of the switch member 604 (see arrow J and arrow K in FIG. 21B) is an activation operation that activates the moving mechanism selected by the turning operation of the lever member 602. The entire switch member 604 can be understood as an operation portion, but in the present embodiment, in order to identify the operational directions of the switch member 604, one lengthwise direction end portion of the switch member 604 is designated as an operation portion 604A.

In this embodiment, when the seated person operates the lever member 602 by turning it, it suffices for the seated person to grip both the lever portion 602A and the switch member 604 and operate both by turning them, for example. Next, when the seated person operates the switch member 604 by turning it, it suffices for the seated person to slightly shift the hand gripping both the lever portion 602A and the switch member 604 and grip just the switch member 604. The turning axis G of the switch member 604 coincides with the turning axis G of the lever member 602, so the switch member 604 can be operated by turning it using the same hand motions as those used in the turning operation of the lever member 602. Because of this, the operability of the lever member 602 and the switch member 604 can be made well.

Seventh Embodiment

Figure 22:
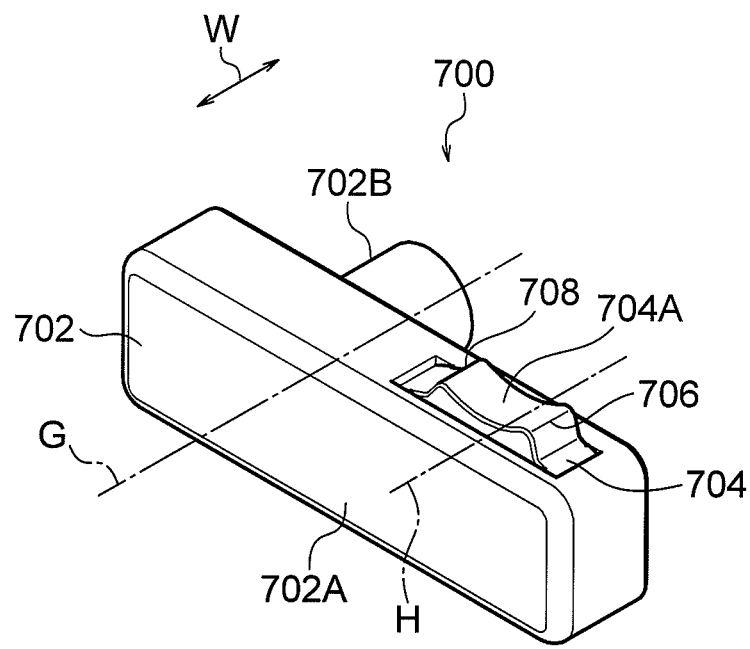
FIG. 22 is a perspective view of a power seat operation device pertaining to a seventh embodiment of the present invention.
Figure 23:
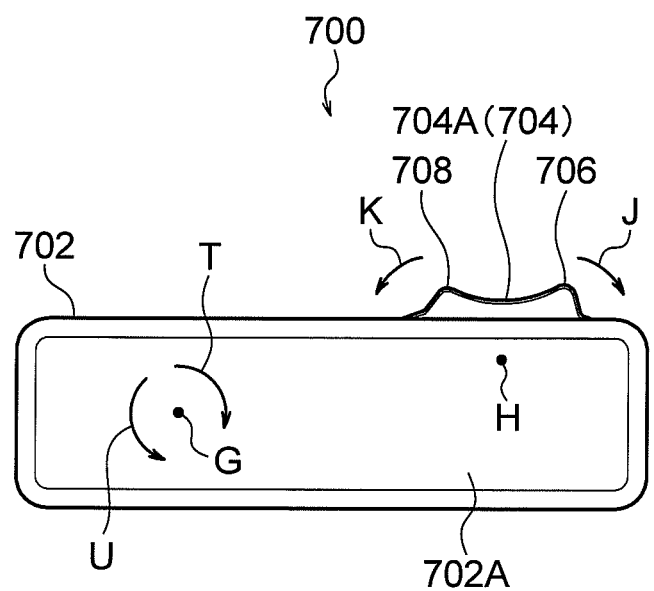
FIG. 23 is a side view of the same power seat operation device.

In FIG. 22, the configuration of a power seat operation device 700 pertaining to a seventh embodiment of the present invention is shown in a perspective view. Furthermore, in FIG. 23, the configuration of the same power seat operation device 700 is shown in a side view. The power seat operation device 700 is equipped with a lever member 702 that serves as a selection operation member and a switch member 704 that serves as an activation operation member. The lever member 702 is, like the lever member 202 of the second embodiment, equipped with a lever portion 702A and a spindle portion 702B. However, the lever portion 702A of the lever member 702 is formed in a long rectangular shape as seen from the seat width direction.

On the other hand, the switch member 704 is disposed on one width direction end side of the distal end side of the lever portion 702A (one turning direction side of the lever member 702) and is attached to the lever portion 702A in such a way as to be turnable about a turning axis H along the seat width direction. An operation portion 704A that projects toward one width direction side of the lever portion 702A is disposed on the switch member 704, and a pair of projecting portions 706 and 708 adjacent to one another in the lengthwise direction of the lever portion 702A are disposed on the operation portion 704A. The turning operation of the switch member 704 (see arrow J and arrow K in FIG. 23) is an activation operation that activates the moving mechanism selected by the turning operation of the lever member 702.

In this embodiment, the seated person can, for example, use the thumb of the hand gripping the lever portion 702A to operate the operation portion 704A of the switch member 704. In that case, the seated person can turn the switch member 704 in the direction of arrow J in FIG. 23 by using the thumb to operate the projecting portion 706 by pressing it. Furthermore, the seated person can turn the switch member 704 in the direction of arrow K by using the thumb to operate the projecting portion 708 by pressing it. In this way, because the switch member 704 can be operated by turning it with a pressing operation, operability is good. Moreover, because the pair of projecting portions 706 and 708 corresponding to the operational directions of the switch member 704 are disposed, the seated person can, for example, select the operational directions of the switch member 704 using the sensation of the thumb. Because of that, erroneous operation can be prevented.

Eighth Embodiment

Figure 24:
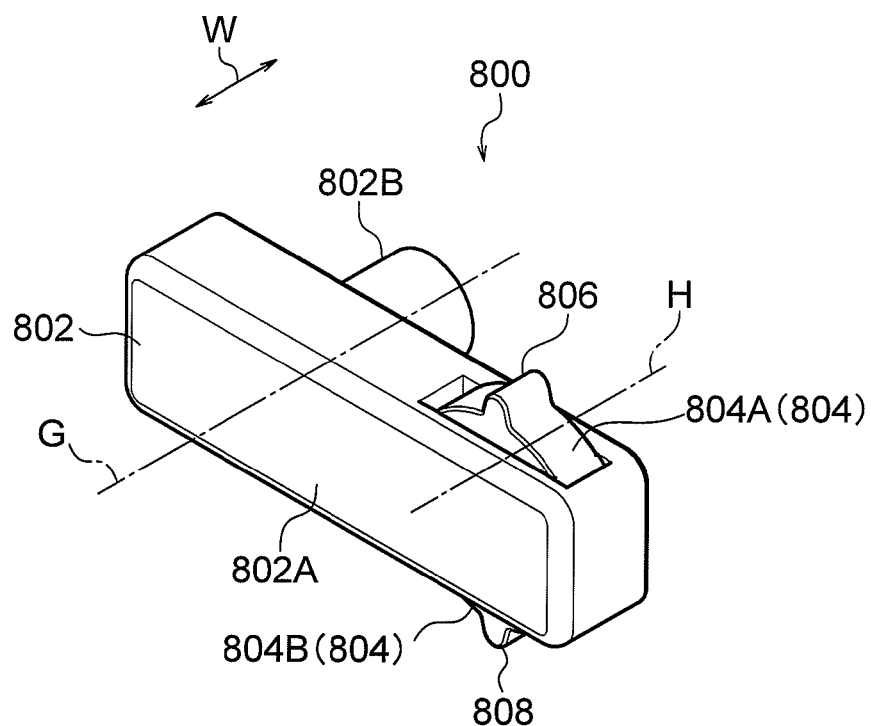
FIG. 24 is a perspective view of a power seat operation device pertaining to an eighth embodiment of the present invention.
Figure 25:
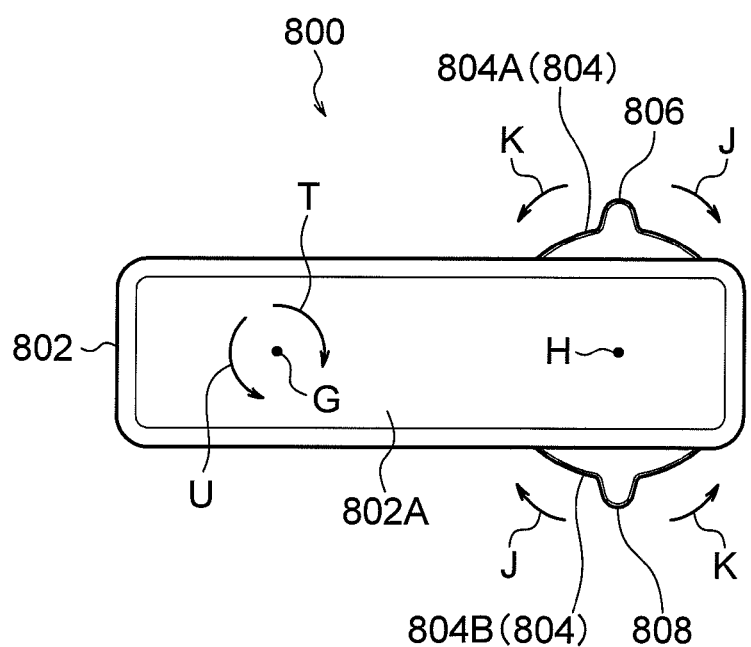
FIG. 25 is a side view of the same power seat operation device.

In FIG. 24, the configuration of a power seat operation device 800 pertaining to an eighth embodiment of the present invention is shown in a perspective view. Furthermore, in FIG. 25, the configuration of the same power seat operation device 800 is shown in a side view. The power seat operation device 800 is equipped with a lever member 802 that serves as a selection operation member and a switch member 804 that serves as an activation operation member. The lever member 802 is, like the lever member 202 of the second embodiment, equipped with a lever portion 802A and a spindle portion 802B. However, the lever portion 802A of the lever member 802 is, like the lever portion 702A pertaining to the seventh embodiment, formed in a long rectangular shape as seen from the seat width direction.

On the other hand, the switch member 804 is disposed on the distal end side of the lever portion 802A and is attached to the lever portion 802A in such a way as to be turnable about a turning axis H along the seat width direction. An operation portion 804A that projects toward one width direction side of the lever portion 802A (one turning direction side of the lever member 802) and an operation portion 804B that projects toward the other width direction side of the lever portion 802A (the other turning direction side of the lever member 802) are disposed on the switch member 804. Projecting portions 806 and 808 are disposed on the operation portions 804A and 804B. The turning operation of the switch member 804 (see arrow J and arrow K in FIG. 25) is an activation operation that activates the moving mechanism selected by the turning operation of the lever member 802.

In this embodiment, when the seated person operates the switch member 804 by turning it, the seated person can, for example, pinch and operate the projecting portion 806 of the operation portion 804A or the projecting portion 808 of the operation portion 804B. Because of that, the operability of the switch member 804 can be made well regardless of the turning angle of the lever member 802.

Ninth Embodiment

Figure 26:
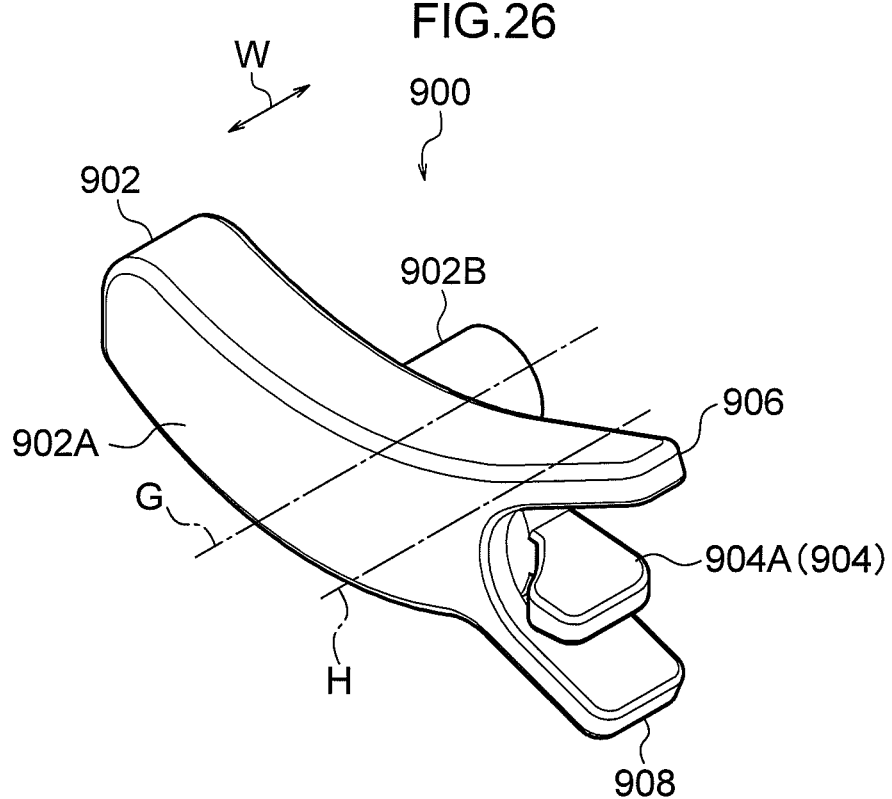
FIG. 26 is a perspective view of a power seat operation device pertaining to a ninth embodiment of the present invention.

In FIG. 26, the configuration of a power seat operation device 900 pertaining to a ninth embodiment of the present invention is shown in a perspective view. Furthermore, in FIG. 27, the configuration of the same power seat operation device 900 is shown in a side view. The power seat operation device 900 is equipped with a lever member 902 that serves as a selection operation member and a switch member 904 that serves as an activation operation member. The lever member 902 is, like the lever member 202 of the second embodiment, equipped with a lever portion 902A and a spindle portion 902B. However, in this lever member 902, the spindle portion 902B is disposed near the lengthwise direction central portion of the lever portion 902A. Furthermore, the lever portion 902A is curved in a circular arc shape as seen from the seat width direction. Moreover, one lengthwise direction end portion of the lever portion 902A branches in two, and a pair of projecting portions 906 and 908 that oppose one another in the width direction of the lever portion 902A (the turning direction of the lever member 902) are disposed thereon.

The switch member 904 is disposed on the distal end side of the lever portion 902A and is attached to the lever portion 902A in such a way as to be turnable about a turning axis H along the seat width direction. An operation portion 904A that projects between the pair of projecting portions 906 and 908 is disposed on the switch member 904. The turning operation of the switch member 904 (see arrow J and arrow K in FIG. 27) is an activation operation that activates the moving mechanism selected by the turning operation of the lever member 902.

Figure 27:
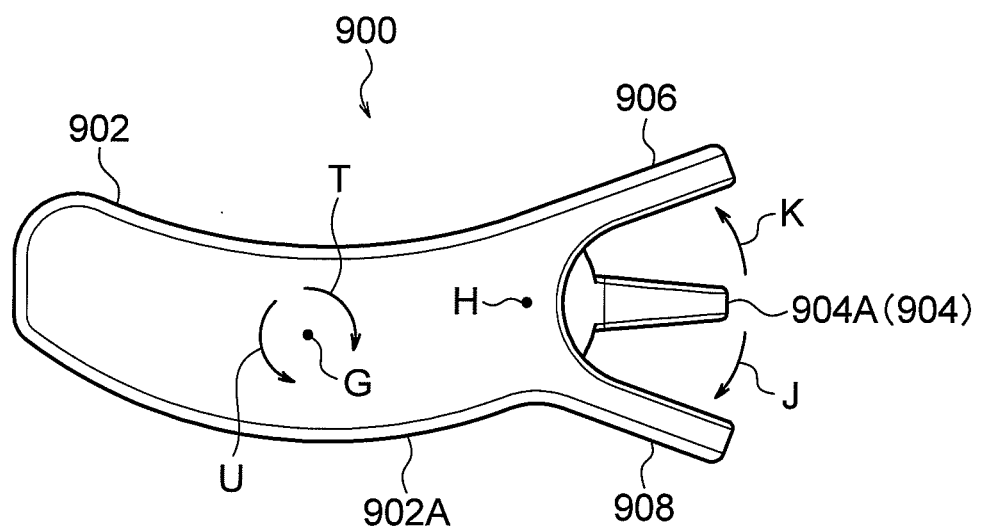
FIG. 27 is a side view of the same power seat operation device.

In this embodiment, when the seated person operates the switch member 904 by turning it in the direction of arrow J in FIG. 27, it suffices for the seated person to hold the operation portion 904A and the projecting portion 908 between the thumb and the index finger, for example. Furthermore, when the seated person operates the switch member 904 by turning it in the direction of arrow K in FIG. 27, it suffices for the seated person to hold the operation portion 904A and the projecting portion 906 between the thumb and the index finger, for example. In that case, the thumb or the index finger of the seated person is supported by the projecting portion 906 or the projecting portion 908, so the operability of the operation portion 904A can be made well. Furthermore, in the present embodiment, because the lever portion 902 is curved in a circular arc shape as seen from the seat width direction, the operational feeling when the seated person grips and operates the lever portion 902 can be made well.

Tenth Embodiment

Next, a tenth embodiment of the present invention will be described with reference to FIG. 28 to FIG. 32. This embodiment is an embodiment in which the present invention is applied to a multi-shaft drive device that drives a power seat.

(Configuration of Multi-Shaft Drive Device)

Figure 28:
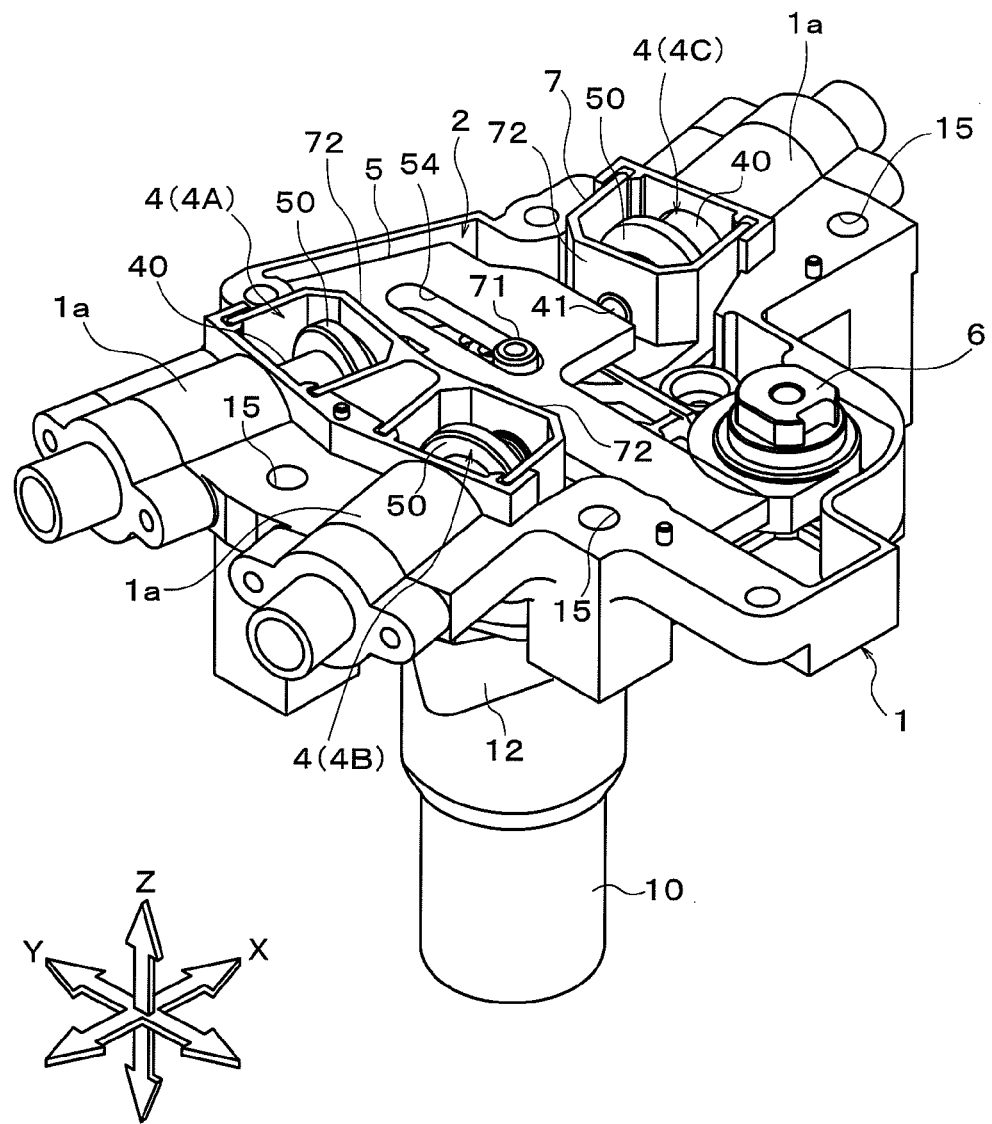
FIG. 28 is a perspective view of a multi-shaft drive device pertaining to a tenth embodiment of the present invention.

FIG. 28 is a perspective view showing an example of a multi-shaft drive device disposed in a power seat. The multi-shaft drive device is a device that uses one motor to selectively drive plural moving mechanisms of the power seat. The moving mechanisms are, for example, a seat sliding mechanism, a recliner mechanism, and an ottoman mechanism like in the first embodiment. However, these moving mechanisms are not each equipped with a dedicated motor and are activated as a result of drive shafts that each mechanism has forwardly or reversely rotating.

Figure 29:
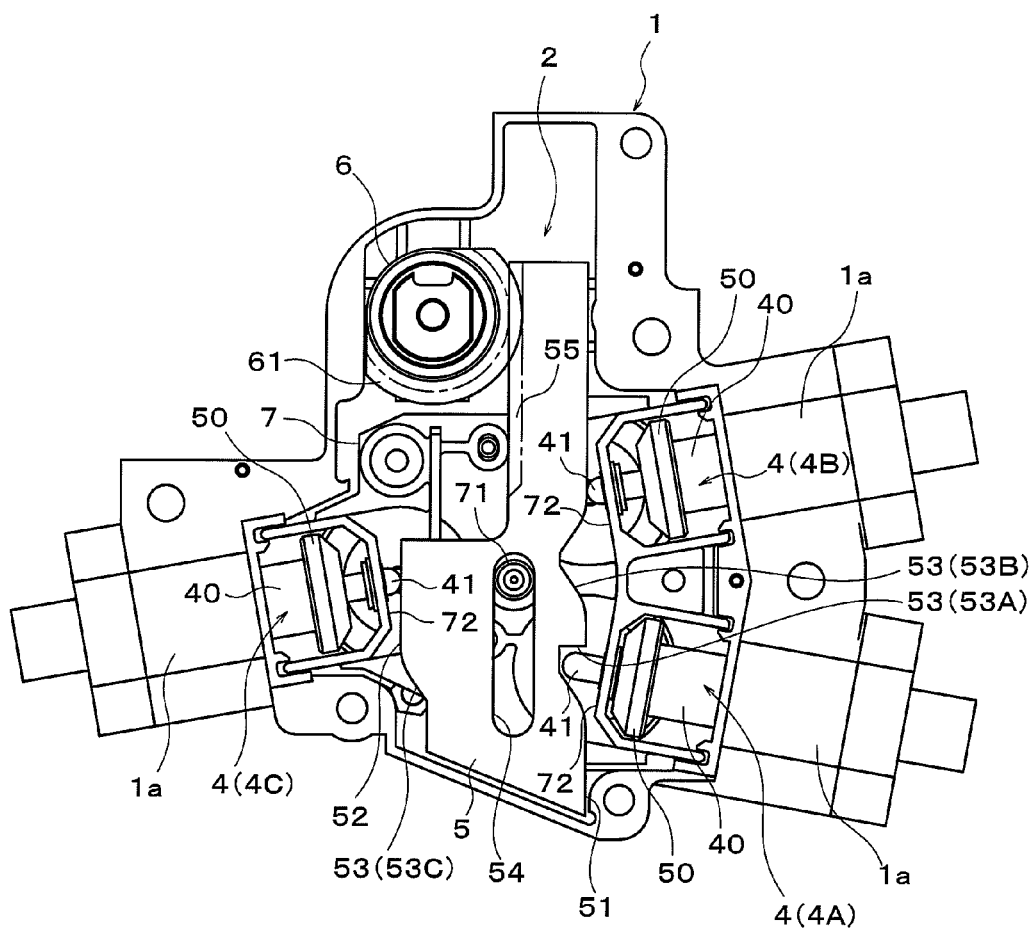
FIG. 29 is a plan view of the multi-shaft drive device.

In FIG. 28 and FIG. 29, reference sign 1 denotes a device case and reference sign 10 denotes a motor. The motor 10 has a rotating shaft 11 (see FIG. 31) that projects upward, and the motor 10 is fixed to the reverse surface of the device case 1 via a bracket 12. The motor 10 and the device case 1 are disposed in the side portion 106A of the seat cushion 106 in a state in which the rotating shaft 11 and a later-described operation shaft 6 are along the seat width direction. A clutch unit 2 is housed in the device case 1. The clutch unit 2 is covered by a non-illustrated cover attached to the device case 1. Furthermore, the device case 1 is fixed to a member such as a seat frame utilizing plural screw insertion holes 15.

Figure 30:
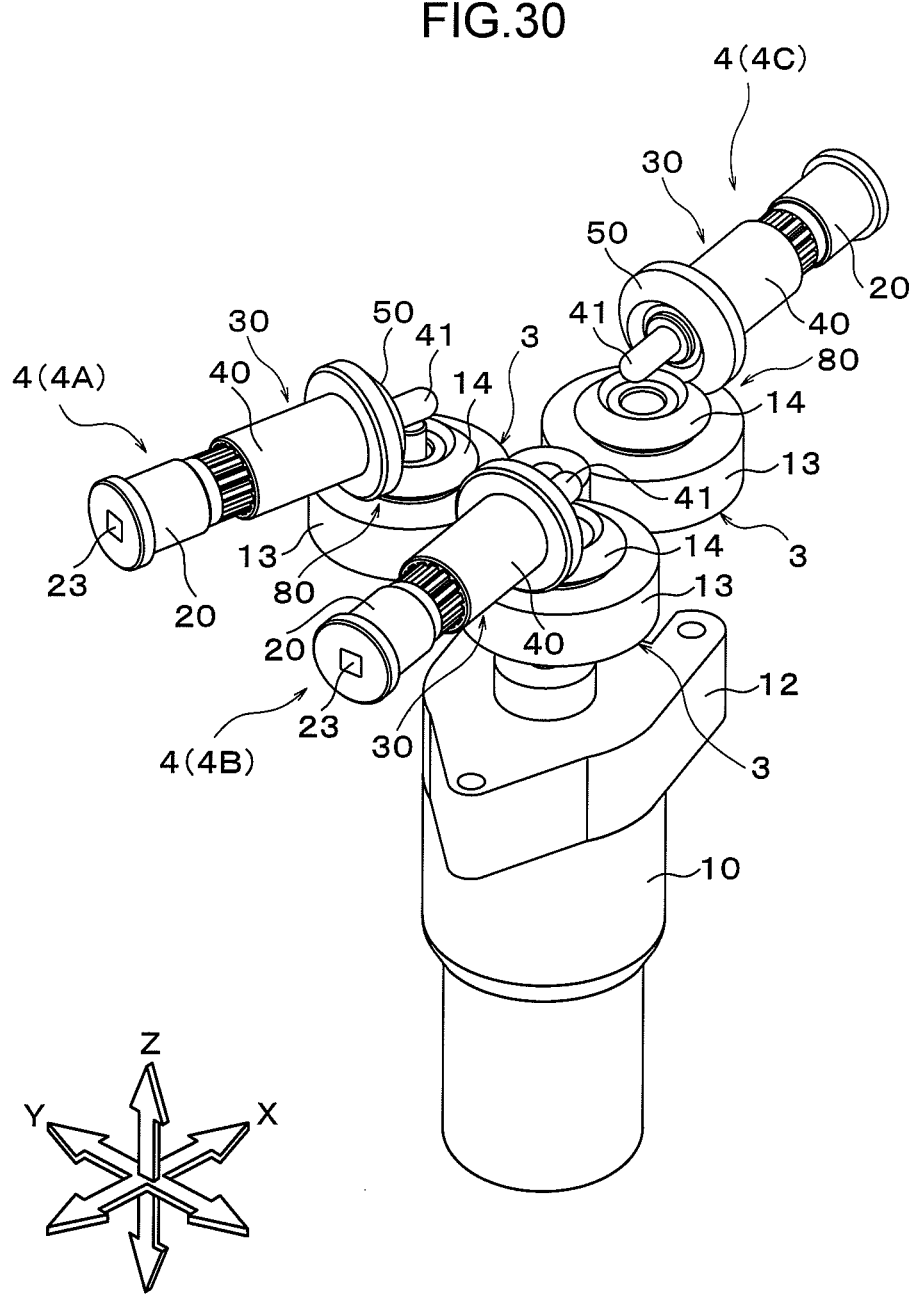
FIG. 30 is a perspective view showing the configurations of main portions of the multi-shaft drive device.
Figure 31:
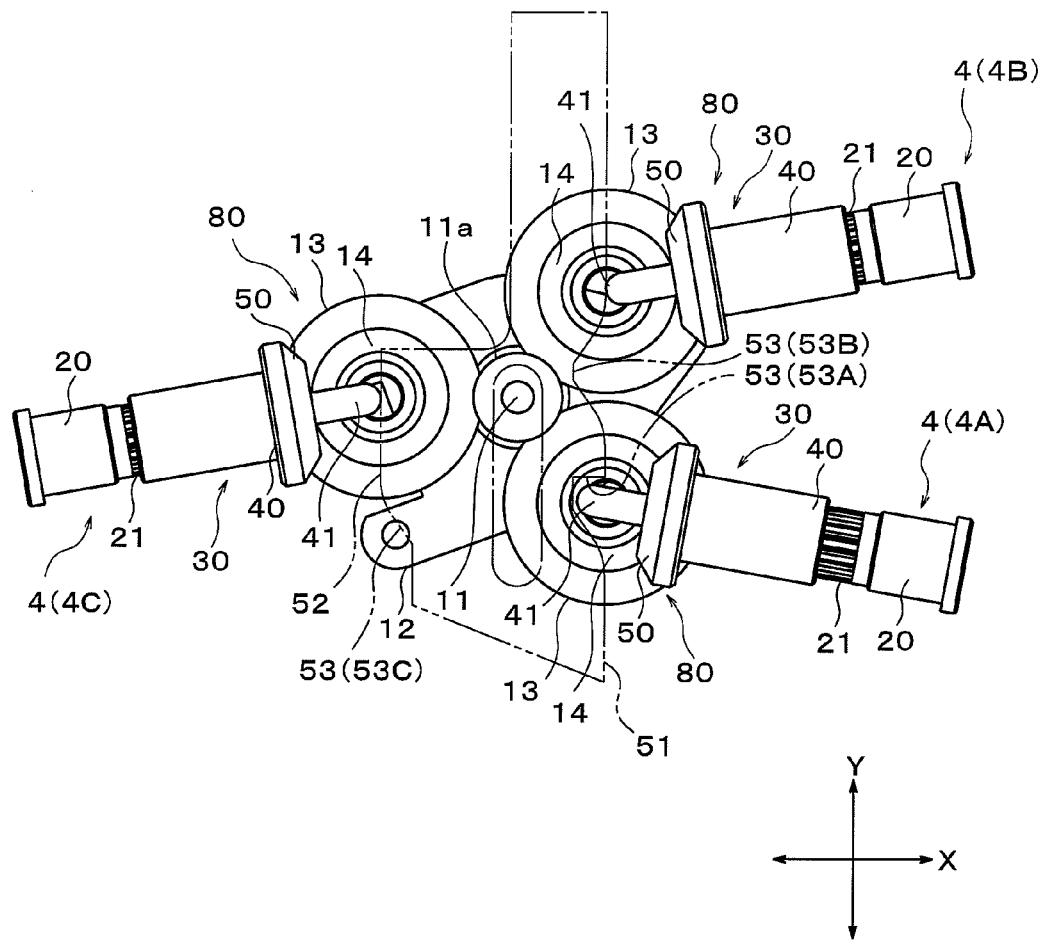
FIG. 31 is a plan view showing the configurations of main portions of the multi-shaft drive device.

As shown in FIG. 30, the clutch unit 2 is equipped with plural input members 3 that are disposed for each of the moving mechanisms and to which the power of the motor 10 is transmitted, plural output members 4 equipped with output shafts 20 that are connected via non-illustrated torque cables (transmission members) to the moving mechanisms, clutch mechanisms 80 that are disposed for each of the input members 3 and the output members 4 and engage and disengage the transmission of the power from the input members 3 to the output shafts 20, a selector member (switching means) 5 that selectively engages the clutch mechanisms 80, and an operation shaft 6 that activates the selector member 5. In the present embodiment, output member 4A is connected to the drive shaft of the seat sliding mechanism via a non-illustrated torque cable, output member 4B is connected to the drive shaft of the recliner mechanism via a non-illustrated torque cable, and output member 4C is connected to the drive shaft of the ottoman mechanism via a non-illustrated torque cable. FIG. 31 is a plan view of a state in which the device case 1 and a gear holder 7 have been removed.

As shown in FIG. 31, the plural input members 3 are equipped with plural (in this case, three) input gears 13 that mesh with a pinion 11a fixed to the upper end of the rotating shaft 11. The input gears 13 are spur gears having rotating shafts parallel to the rotating shaft 11, and input-side bevel gears (input-side clutch members) 14 comprising resin are concentrically fixed to the upper end surfaces of the input gears 13. The input gears 13 and the input-side bevel gears 14 are supported in such a way that they may freely rotate in the device case 1 via non-illustrated input shafts parallel to the rotating shaft 11 along the Z direction. The power of the motor 10 is transmitted to the input gears 13, and when the motor 10 is activated, the input-side bevel gears 14 constantly rotate.

Reference sign 7 in FIG. 28 and FIG. 29 denotes a plate-like gear holder. The gear holder 7 is fixed covering the input members 3 in the device case 10. A guide projection 71 that projects in the Z direction is formed in a predetermined place on the gear holder 7. Furthermore, the selector member 5 is a plate-like member that is long in the Y direction in FIG. 28 and FIG. 29. A guide hole 54 that extends in the Y direction and corresponds to the guide projection 71 is formed in the selector member 5, and the guide projection 71 is inserted into the guide hole 54, respectively. The selector member 5 is supported in such a way that it may freely slide in the Y direction on the gear holder 7 as a result of being guided by the guide projection 71.

Of both side surfaces of the selector member 5 along the Y direction, the side surface on the right side in FIG. 29 is a first cam surface 51. Furthermore, the lower side of the side surface on the left side is a second cam surface 52, and a rack 55 having a row of teeth lined up in the Y direction is formed on the upper side. The operation shaft 6 is supported in such a way that it may freely rotate in the device case 1 taking the Z direction as its rotational axis, and a pinion 61 that meshes with the rack 55 is formed on the operation shaft 6. The coupling shaft 132A disposed on the dial member 128 of the power seat operation device 100 pertaining to the first embodiment is coaxially coupled to, in such a way as to be integrally rotatable with, the operation shaft 6. For this reason, when the operation shaft 6 is rotated via the dial member 128, the selector member 5 is reciprocally moved, via the rack 55 by the rotating pinion 61, in the Y direction in accordance with the rotational direction of the operation shaft 6.

The switch body 150 of the power seat operation device 100 is electrically connected to the motor 10, and the motor 10 is turned on and off and the rotational direction of the motor 10 is selected by the turning operation of the switch member 130. When the motor 10 runs, all the input members 3 rotate.

As shown in FIG. 31, the plural output members 4 are disposed opposing the cam surfaces 51 and 52 on both X direction sides of the selector member 5. In this case, two output members 4 (a first output member 4A and a second output member 4B) are disposed spaced apart from one another in the Y direction in opposition to the first cam surface 51, and one output member 4 (a third output member 4C) is disposed in opposition to the second cam surface 52. The plural output members 4 have the output shafts 20 and are housed in the device case 1 in a state in which the sliding directions of the output shafts 20 are parallel to the X-Y plane orthogonal to the Z direction and in which the sliding directions of the output shafts 20 are slanted a predetermined angle relative to the cam surfaces 51 and 52.

Figure 32A:
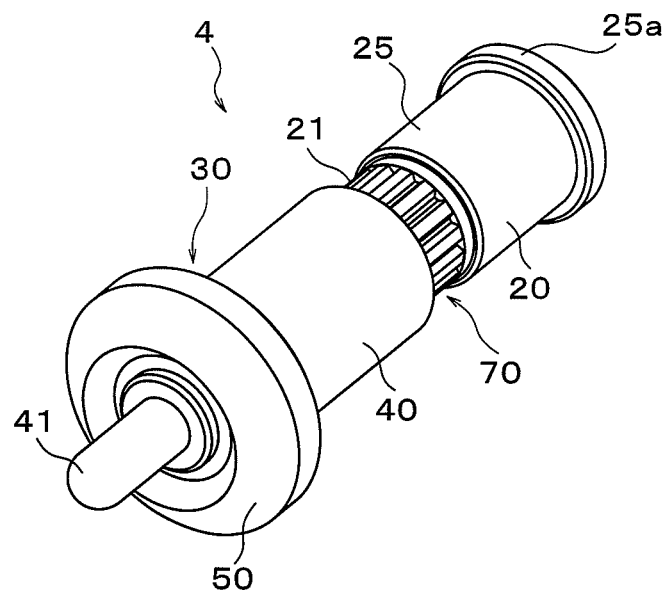
FIG. 32A, FIG. 32B, and FIG. 32C show the configuration of an output member of the multi-shaft drive device, with FIG. 32A being a perspective view, FIG. 32B being a lengthwise-divided perspective view, and FIG. 32C being a lengthwise-divided sectional view.
Figure 32B:
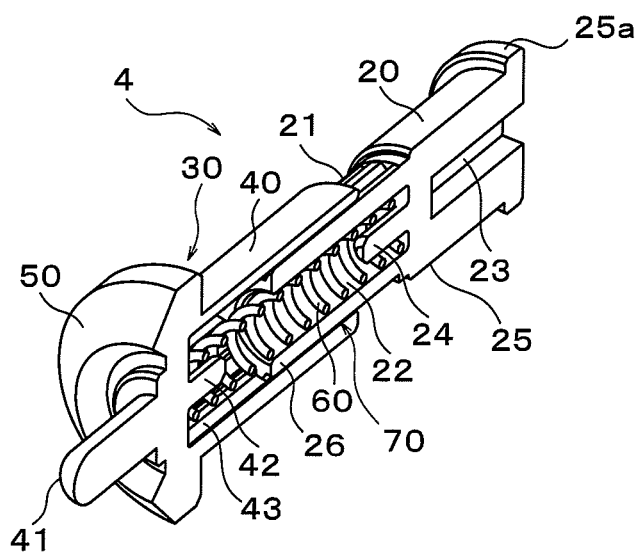
Figure 32C:
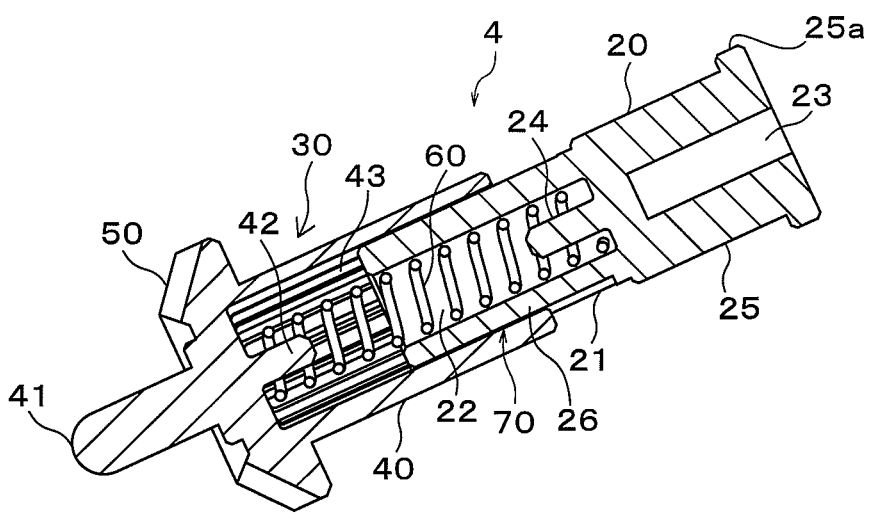

As shown in FIG. 32A to FIG. 32C, each output shaft 20 comprises a large diameter portion 25 having a cylinder portion 26 formed on its distal end side and is disposed a certain distance apart from the selector member 5. A flange 25a is formed on the rear end of the large diameter portion 25. Each output shaft 20 is supported in such a way that the large diameter portion 25 may freely rotate and is immovable in the sliding direction in a cylindrical bearing holder portion 1a formed in the device case 1 via a non-illustrated bearing bush.

A power transmitting portion 30 that transmits the rotation of the input-side bevel gear 14 on the corresponding input gear 13 to the output shaft 20 is disposed on the distal end side (the selector member 5 side) of the output shaft 20. As shown in FIG. 32A to FIG. 32C, the power transmitting portion 30 is configured from a moving shaft 40, an output-side bevel gear (output-side clutch member) 50, and a coil spring (urging member) 60. The moving shaft 40 is fitted over the outer peripheral side of the output shaft 20 in such a way that the moving shaft 40 can move toward and away from the selector member 5. The moving shaft 40 is fitted over the output shaft 20 in a state in which the moving shaft 40 is slidable and relatively non-rotatable in the axial direction of the output shaft 20 by a guide portion 70.

The guide portion 70 in this case is configured by a cross-sectionally concavo-convex outside engaging portion 21, which is formed all around the outer peripheral surface of the output shaft 20, and a cross-sectionally concavo-convex inside engaging portion 43, which is formed on the inner peripheral surface of the moving shaft 40 and is engaged with the outside engaging portion 21 in such a way as to be slidable in the axial direction. In this case, the engaging portions 21 and 43 are configured by so-called splines in which numerous cross-sectionally rectangular grooves and ridges that engage with one another are alternately formed.

The output-side bevel gear 50, which is capable of meshing with the input-side bevel gear 14, is concentrically and integrally molded on the distal end portion of the moving shaft 40. The output-side bevel gear 50 configures the clutch mechanism 80 together with the input-side bevel gear 14. A projecting portion 41 that projects on the distal end side is formed on the distal end of the moving shaft 40 and in the center of the output-side bevel gear 50. A guide hole 22 that opens to the distal end side is formed in the axial center of the output shaft 20, and the coil spring 60 that urges the moving shaft 40 in such a way that the moving shaft 40 moves toward the selector member 5 side is housed in the guide hole 22. Projections 24 and 42 that are inserted into the end portions of the coil spring 60 and position the coil spring 60 are formed in the output shaft 20 and the moving shaft 40, respectively. Furthermore, a cross-sectionally rectangular attachment hole 23 is formed in the rear end surface of the output shaft 20, and one end portion of the above-described torque cable is attached to the attachment hole 23. The torque cable rotates together with the output shaft 20.

The coil springs 60 are housed in the cylinder portions 26 of the output shafts 20 and the moving shafts 40 in a compressed state, and the output-side bevel gears 50 are urged by the coil springs 60 in the direction of the selector member 5 (one direction in the axial direction of the moving shafts 40) so that the distal ends of the projecting portions 41 strike the cam surfaces 51 and 52. The distal end surfaces of the projecting portions 41 are formed in a spherical shape, and when the selector member 5 is moved in the Y direction, the distal end surfaces of the projecting portions 41 slidingly contact the cam surfaces 51 and 52 that they are striking.

As shown in FIG. 29 and FIG. 31, recessed portions 53 (a first recessed portion 53A and a second recessed portion 53B) corresponding to the first output member 4A and the second output member 4B are formed in the first cam surface 51 of the selector member 5, and a recessed portion 53 (a third recessed portion 53C) corresponding to the third output member 4C is formed in the second cam surface 52. When the selector member 5 is moved in the Y direction, the projecting portion 41 of any one of the output members 4 fits into a recessed portion 53.

When the projecting portion 41 fits into the recessed portion 53 in this way, the entire output-side bevel gear 50 slides in the direction of the selector member 5, so that at this time the output-side bevel gear 50 engages and meshes with the input-side bevel gear 14 and the clutch mechanism 80 becomes engaged. The projecting portions 41 of the output-side bevel gears 50 penetrate non-illustrated through holes formed in wall portions 72 (see FIG. 28 and FIG. 29) formed in the gear holder 7. Non-illustrated bearing bushes are press-fitted and fixed in the through holes, so that the projecting portions 41 are supported in such a way that they may freely slide and rotate and may freely move in the sliding direction in the bearing bushes. When the clutch mechanism 80 is engaged, the distal end surface of the output-side bevel gear 50 is in contact with the wall portion 72, and because of this, the stroke end during the advance of the output-side bevel gear 50 is regulated.

When the motor 10 runs and the input member 3 rotates when the clutch mechanism 80 is engaged, the rotation is transmitted from the input-side bevel gear 14 to the output-side bevel gear 50, the output-side bevel gear 50 rotates, the rotation of the moving shaft 40 is transmitted to the output shaft 20, and the output shaft 20 rotates. Furthermore, in a state in which the projecting portion 41 is not fitted in the convex portion 53 and is striking the cam surface 51 (52), the output-side bevel gear 50 is pressed toward the output shaft 20 side counter to the coil spring 60 by the cam surface 51 (52). At this time, the output-side bevel gear 50 is away from the input-side bevel gear 14 so that the clutch mechanism 80 becomes disengaged.

In the present embodiment, in a state in which the dial member 128 is positioned in the position in which the operational directions of the switch member 130 of the power seat operation device 100 are along the seat front and rear direction (see FIG. 5A), the projecting portion 41 of the output-side bevel gear 50 of the output member 4A is fitted into the recessed portion 53A of the selector member 5. In this state, when the operation portion 130A of the switch member 130 is operated by being turned toward the seat front side (see arrow J in FIG. 5A), the forward direction rotational force of the motor 10 is transmitted via the output member 4A and the torque cable to the seat sliding mechanism so that the seat cushion 106 is slid toward the seat front side relative to the vehicle body floor portion (see arrow L in FIG. 5B). Furthermore, when the operation portion 130A of the switch member 130 is operated by being turned toward the seat rear side (see arrow K in FIG. 5A), the reverse direction rotational force of the motor 10 is transmitted via the output member 4A and the torque cable to the seat sliding mechanism so that the seat cushion 106 is slid toward the seat rear side relative to the vehicle body floor portion (see arrow M in FIG. 5B).

In a state in which the dial member 128 is positioned in the position in which the operational directions of the switch member 130 are along a direction slanted down in front relative to the seat front and rear direction (see FIG. 6A), the projecting portion 41 of the output-side bevel gear 50 of the output member 4B is fitted into the recessed portion 53B of the selector member 5. In this state, when the operation portion 130A of the switch member 130 is operated by being turned obliquely downward toward the seat front side (see arrow J in FIG. 6A), the forward direction rotational force of the motor 10 is transmitted via the output member 4B and the torque cable to the recliner mechanism so that the seat back 120 is turned toward the seat front side relative to the seat cushion 106 (see arrow N in FIG. 6B). Furthermore, when the operation portion 130A of the switch member 130 is operated by being turned obliquely upward toward the seat rear side (see arrow K in FIG. 6A), the reverse direction rotational force of the motor 10 is transmitted via the output member 4B and the torque cable to the seat sliding mechanism so that the seat back 120 is turned toward the seat rear side relative to the seat cushion 106 (see arrow O in FIG. 6B).

Furthermore, in a state in which the dial member 128 is positioned in the position in which the operational directions of the switch member 130 are along the seat up and down direction (see FIG. 7A), the projecting portion 41 of the output-side bevel gear 50 of the output member 4C is fitted into the recessed portion 53C of the selector member 5. In this state, when the operation portion 130A of the switch member 130 is operated by being turned upward (see arrow K in FIG. 7A), the reverse direction rotational force of the motor 10 is transmitted via the output member 4C and the torque cable to the ottoman mechanism so that the ottoman 124 is turned upward relative to the seat cushion 106 (see arrow P in FIG. 7B). Furthermore, when the operation portion 130A of the switch member 130 is operated by being turned downward (see arrow J in FIG. 7A), the forward direction rotational force of the motor 10 is transmitted via the output member 4C and the torque cable to the ottoman mechanism so that the ottoman 124 is turned downward relative to the seat cushion 106 (see arrow Q in FIG. 7B).

(Actions of Multi-Shaft Drive Device)

Next, the actions of the multi-shaft drive device will be described.

The moving shaft 40 in the power transmitting portion 30 urged toward the selector member 5 side by the coil spring 60 slides relative to the output shaft 20 in such a way as to reciprocally move between two positions—a clutch disengaged position in which the projecting portion 41 on the distal end of the moving shaft 40 is in contact with the cam surface 51 (52) of the selector member 5 and a clutch engaged position in which the projecting portion 41 on the distal end of the moving shafts 40 has entered the recessed portion 53—as a result of the selector member 5 reciprocally moving in the Y direction in accompaniment with the rotation of the operation shaft 6. As the selector member 5 is moved, the projecting portion 41 of the moving shaft 40 in the clutch disengaged position enters the recessed portion 53 by way of the slanted surface and advances to the clutch engaged position. Additionally, when the selector member 5 moves further from there, the projecting portion 41 comes into contact with the cam surface 51 (52) by way of the slanted surface.

Figure 4:
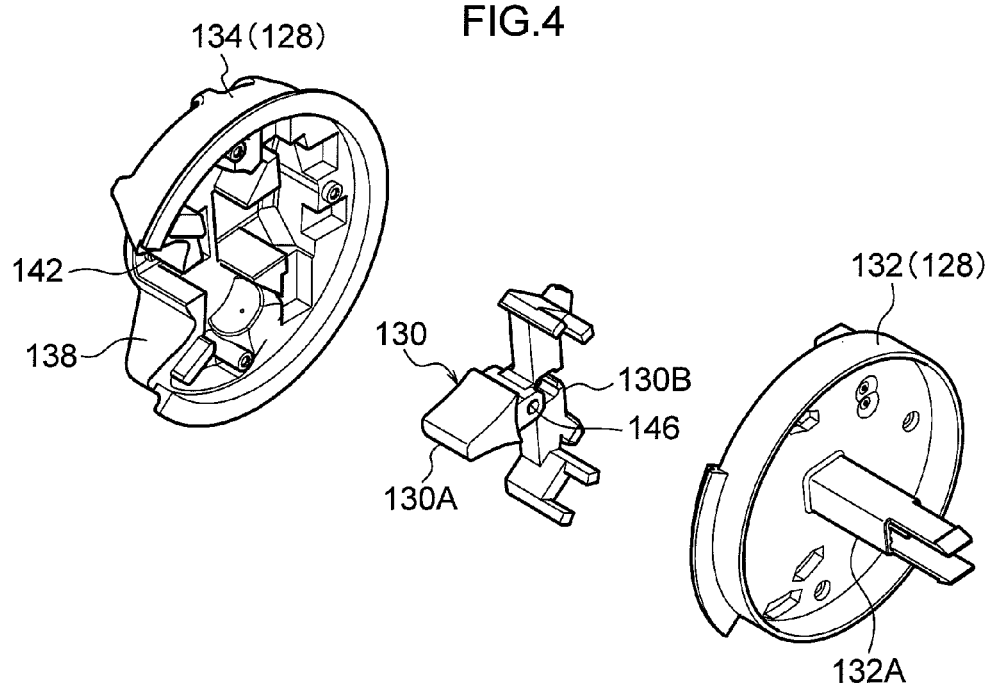
FIG. 4 is an exploded perspective view of the same power seat operation device as seen from a different angle from that of FIG. 3.

In the clutch disengaged position, like the power transmitting portions 30 on the left side and the upper right side of FIG. 4, the moving shaft 40 moves back toward the output shaft 20 side as a result of the cam surface 51 (52) of the selector member 5 pressing the projecting portion 41 counter to the coil spring 60. Because of this, the output-side bevel gear 50 separates from the input-side bevel gear 14 and the clutch mechanism 80 becomes disengaged. In a state in which the clutch mechanism 80 is disengaged, the input gear 13 that is rotating as a result of the motor 10 being activated idles, the power of the motor 10 is not transmitted to the output-side bevel gear 50, and the output shaft 20 does not rotate. Consequently, the torque cable is not activated.

Next, when the operation shaft 6 is rotated and the selector member 5 is moved, the recessed portion 53 opposes the projecting portion 41 of the moving shaft 40. At that time, the projecting portion 41 enters the recessed portion 53 by way of the slanted surface, and the moving shaft 40 advances to the clutch engaged position. Then, the output-side bevel gear 50 meshes with the input-side bevel gear 14 and the clutch mechanism 80 becomes engaged. When the clutch mechanism 80 becomes engaged, the rotation of the motor 50 is transmitted to the output-side bevel gear 50 from the input-side bevel gear 14 fixed to the input gear 13, is further transmitted to the output shaft 20 via the guide portion 70 from the moving shaft 40 integrated with the output-side bevel gear 50, and the output shaft 20 rotates. Additionally, the torque cable rotates and is activated.

These are the actions of the multi-shaft drive device, and any of the moving mechanisms among the seat sliding mechanism, the recliner mechanism, and the ottoman mechanism is selected as the target of operation by rotating the operation shaft 6 via the dial member 128 of the power seat operation device 100 to bring the recessed portion 53 of the selector member 5 into opposition with the power transmitting portion 30 of the output shaft 20 the seated person wants to activate. Additionally, when the switch member 130 of the power seat operation device 100 is operated by turning it to thereby activate the motor 10, the output shaft 20 the seated person wants to activate and the torque cable connected to that output shaft 20 rotate, the rotational force of the motor 10 is transmitted to the moving mechanism selected as the target of operation, and that moving mechanism is activated. In this way, in the present embodiment, plural moving mechanisms can be activated by the one motor 10, so weight and costs can be reduced compared to a configuration where motors are disposed for each moving mechanism.

The configurations of the multi-shaft drive device are not limited to those in the tenth embodiment; for example, friction clutches that rely on joint contact between friction surfaces can also be employed as the clutch mechanisms. Furthermore, instead of the power seat operation device 100, any of the power seat operation devices 200 to 900 shown in FIG. 14 to FIG. 27 can be applied.

Furthermore, in the above-described embodiments, a case was described where a seat sliding mechanism, a recliner mechanism, an ottoman mechanism, a lifter mechanism, and a tilt mechanism served as the moving mechanisms, but the present invention is not limited to this and can apply other types of moving mechanisms, such as a lumbar support mechanism and a side support mechanism, as the moving mechanisms.

In addition, the present invention can be modified and implemented in a variety of ways without departing from the spirit thereof. Furthermore, the scope of rights of the present invention is of course not limited to the embodiments.

What is claimed is:

1. A power seat operation device comprising:
a selection operation member that is disposed in such a way as to be turnable relative to a power seat, with the turning operation of the selection operation member relative to the power seat being a selection operation that selects a moving mechanism that becomes a target of operation from among a plurality of moving mechanisms disposed in the power seat, the selection operation member comprising an outer peripheral portion and a recessed portion disposed in the outer peripheral portion, the outer peripheral portion defining a virtual circle centered on the turning axis of the selection operation member, the recessed portion being open in a direction away from the turning axis at least at the outer peripheral portion; and
an activation operation member that is disposed in such a way as to be turnable about a turning axis of the selection operation member or about a turning axis along that turning axis relative to the selection operation member, with the turning operation of the activation operation member relative to the selection operation member being an activation operation that activates the moving mechanism selected by the selection operation, the activation operation member comprising an operation portion,
wherein the operation portion is disposed in the recessed portion.

2. The power seat operation device according to claim 1, wherein:
the plurality of moving mechanisms includes a moving mechanism that causes a moving part to turn about a turning axis along the seat width direction, and
the selection operation member is disposed in such a way that the turning axis of the activation operation member is along the seat width direction.

3. The power seat operation device according to claim 1, wherein the activation operation member is disposed on one turning axis direction side of the selection operation member relative to the selection operation member and is turnable about the turning axis of the selection operation member relative to the selection operation member.

4. A power seat comprising:
a plurality of moving mechanisms that includes:
a seat sliding mechanism that causes a seat cushion to slide in the seat front and rear direction relative to a vehicle body floor portion, and
a recliner mechanism that causes a seat back to turn about a turning axis along the seat width direction relative to the seat cushion, and also includes one of:
a lifter mechanism that causes the seat cushion to move up and down relative to the vehicle body floor portion, and
an ottoman mechanism that causes an ottoman to turn about a turning axis along the seat width direction relative to the seat cushion; and
the power seat operation device according to claim 1, with the selection operation member being disposed on a side portion of the seat cushion in a state in which the turning axis of the selection operation member is aligned with the seat width direction, wherein:
- in a state in which the selection operation member is positioned in a position in which the operational directions of an operation portion of the activation operation member are along the seat front and rear direction, the seat sliding mechanism is selected as the target of operation,
- in a state in which the selection operation member is positioned in a position in which the operational directions of the operation portion are along a direction slanted relative to the seat front and rear direction, the recliner mechanism is selected as the target of operation, and
- in a state in which the selection operation member is positioned in a position in which the operational directions of the operation portion are along the seat up and down direction, either the lifter mechanism or the ottoman mechanism is selected as the target of operation.

5. A power seat comprising:
a plurality of moving mechanisms that includes:
- a seat sliding mechanism that causes a seat cushion to slide in the seat front and rear direction relative to a vehicle body floor portion,
- a recliner mechanism that causes a seat back to turn about a turning axis along the seat width direction relative to the seat cushion,
- a lifter mechanism that causes the seat cushion to move up and down relative to the vehicle body floor portion, and
- an ottoman mechanism that causes an ottoman to turn about a turning axis along the seat width direction relative to the seat cushion; and the power seat operation device according to claim 1, with the selection operation member being disposed on a side portion of the seat cushion in a state in which the turning axis of the selection operation member is aligned with the seat width direction, wherein:
- in a state in which the selection operation member is positioned in a position in which the operational directions of an operation portion of the activation operation member are along the seat front and rear direction, the seat sliding mechanism is selected as the target of operation,
- in a state in which the selection operation member is positioned in a position in which the operational directions of the operation portion are along the seat up and down direction, the lifter mechanism is selected as the target of operation,
- in a state in which the selection operation member is positioned in a position in which the operational directions of the operation portion are along a direction slanted up in front relative to the seat front and rear direction, one of the recliner mechanism and the ottoman mechanism is selected as the target of operation, and
- in a state in which the selection operation member is positioned in a position in which the operational directions of the operation portion are along a direction slanted down in front relative to the seat front and rear direction, the other of the recliner mechanism and the ottoman mechanism is selected as the target of operation.

6. A power seat comprising:
a plurality of moving mechanisms that includes:
- a seat sliding mechanism that causes a seat cushion to slide in the seat front and rear direction relative to a vehicle body floor portion,
- a recliner mechanism that causes a seat back to turn about a turning axis along the seat width direction relative to the seat cushion,
- a lifter mechanism that causes the seat cushion to move up and down relative to the vehicle body floor portion, and
- a tilt mechanism that causes a front portion of the seat cushion to move up and down relative to the vehicle body floor portion; and the power seat operation device according to claim 1, with the selection operation member being disposed on a side portion of the seat cushion in a state in which the turning axis of the selection operation member is aligned with the seat width direction, wherein
- in a state in which the selection operation member is positioned in a first position in which the operational directions of an operation portion of the activation operation member are along the seat front and rear direction, the seat sliding mechanism is selected as the target of operation,
- in a state in which the selection operation member is positioned in a second position in which the operational directions of the operation portion are along the seat up and down direction, the lifter mechanism is selected as the target of operation,
- in a state in which the selection operation member is positioned in a third position in which the operational directions of the operation portion are along a direction slanted down in front relative to the seat front and rear direction, one of the recliner mechanism and the tilt mechanism is selected as the target of operation, and
- in a state in which the selection operation member is positioned in a fourth position in which the operational directions of the operation portion are along a direction slanted further down in front than the third position relative to the seat front and rear direction, the other of the recliner mechanism and the tilt mechanism is selected as the target of operation.

\* \* \* \* \*